United States Patent
Ujiie et al.

(10) Patent No.: US 9,973,487 B2
(45) Date of Patent: May 15, 2018

(54) AUTHENTICATION METHOD

(71) Applicant: Panasonic Intellectual Property Corporation of America, Torrance, CA (US)

(72) Inventors: Yoshihiro Ujiie, Osaka (JP); Motoji Ohmori, Osaka (JP); Hideki Matsushima, Osaka (JP); Tomoyuki Haga, Nara (JP); Manabu Maeda, Osaka (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 162 days.

(21) Appl. No.: 15/012,915

(22) Filed: Feb. 2, 2016

(65) Prior Publication Data

US 2016/0149890 A1 May 26, 2016

Related U.S. Application Data

(63) Continuation of application No. PCT/JP2014/006011, filed on Dec. 2, 2014.
(Continued)

(30) Foreign Application Priority Data

Sep. 30, 2014 (JP) .................. 2014-200888

(51) Int. Cl.
*H04L 9/00* (2006.01)
*H04L 29/06* (2006.01)
(Continued)

(52) U.S. Cl.
CPC .............. *H04L 63/08* (2013.01); *G06F 21/44* (2013.01); *H04L 9/3268* (2013.01);
(Continued)

(58) Field of Classification Search
CPC .................................................... H04L 9/0891
See application file for complete search history.

(56) References Cited

U.S. PATENT DOCUMENTS 6,487,658 B1   11/2002  Micali
7,840,812 B1   11/2010  Levenberg
(Continued)

FOREIGN PATENT DOCUMENTS

JP   2004-234648   8/2004
JP   2010-271851   12/2010
WO   2004/086235   10/2004

OTHER PUBLICATIONS

International Search Report of PCT application No. PCT/JP2014/006011 dated Jan. 27, 2015.
(Continued)

*Primary Examiner* — Josnel Jeudy
(74) *Attorney, Agent, or Firm* — Greenblum & Bernstein, P.L.C.

(57) ABSTRACT

An authentication method for at least one of a plurality of devices connected to a HAN includes checking, with a first device among the plurality of devices, validity of a second device using a CRL including attribute information regarding the second device among the plurality of devices, and revoking, with the first device, the second device if a result of the checking is negative.

8 Claims, 26 Drawing Sheets

Related U.S. Application Data

(60) Provisional application No. 61/930,202, filed on Jan. 22, 2014.

(51) Int. Cl.

| | | |
|---|---|---|
| *H04L 9/32* | (2006.01) | |
| *G06F 21/44* | (2013.01) | |
| *H04L 12/28* | (2006.01) | |
| *H04L 12/46* | (2006.01) | |

(52) U.S. Cl.
CPC ...... *H04L 12/2803* (2013.01); *H04L 12/4625* (2013.01); *H04L 63/0823* (2013.01); *H04L 63/101* (2013.01)

(56) References Cited

U.S. PATENT DOCUMENTS

| | | | | |
|---|---|---|---|---|
| 2004/0003239 | A1* | 1/2004 | Ohmori | G11B 20/00086 713/158 |
| 2004/0162870 | A1 | 8/2004 | Matsuzaki et al. | |
| 2006/0143442 | A1* | 6/2006 | Smith | H04L 63/0823 713/156 |
| 2006/0171391 | A1 | 8/2006 | Suzuki | |
| 2007/0199049 | A1* | 8/2007 | Ziebell | H04L 63/08 726/3 |
| 2009/0198618 | A1* | 8/2009 | Chan | G06Q 20/02 705/66 |
| 2010/0142410 | A1* | 6/2010 | Huynh Van | H04L 12/4633 370/255 |
| 2010/0318791 | A1 | 12/2010 | Shamsaasef et al. | |
| 2013/0061055 | A1* | 3/2013 | Schibuk | G06Q 20/223 713/172 |
| 2014/0281502 | A1* | 9/2014 | Keung Chan | H04L 9/3265 713/157 |

OTHER PUBLICATIONS

"Wi-Fi Certified Wi-Fi Protected Setup" Wi-Fi Alliance, Dec. 2010.
Atsuko Miyaji et al. "Information Security" Ohm-sha pp. 140-147, Oct. 25, 2003 (Partial Translation).
"Suite B Implementers Guide to FIPS 186-3(ECDSA)" Feb. 3, 2010.
Elaine Barker et al., "Recommendation for Pair-Wise Key Establishment Schemes Using Discrete Logarithm Cryptography" NIST Special Publication 800-56A Revision 2, May 2013.
D. Forsberg et al., "Protocol for Carrying Authentication for Network Access (PANA)", RFC5191, May 2008.
Jeffrey Mogul, "Broadcasting Internet Datagrams", RFC919, Oct. 1984.
The Extended European Search Report dated Oct. 24, 2016 for European Patent Application No. 14879415.9.

* cited by examiner

| DEVICE ID | CERTIFICATE ID | TYPE | COUNTRY | COMPANY |
|---|---|---|---|---|
| P123456789 | abcdef1234 | AIR CONDITIONER | COUNTRY L | COMPANY A |
| S321654987 | 1a2b3c4d5e | TELEVISION SET | COUNTRY M | COMPANY B |
| T456789012 | 06zyx03qrs | WASHING MACHINE | COUNTRY N | COMPANY C |
| ... | ... | ... | ... | ... |

| CONTROLLER ID | CERTIFICATE ID | CONTROLLER TYPE | COUNTRY | COMPANY |
|---|---|---|---|---|
| C987654321 | aaabbbccc0 | A-TYPE CONTROLLER | COUNTRY K | COMPANY D |

| DEVICE ID | CERTIFICATE ID | TYPE | COUNTRY | COMPANY |
|---|---|---|---|---|
| P123456789 | abcdef1234 | AIR CONDITIONER | COUNTRY L | COMPANY A |

| CONTROLLER ID | CERTIFICATE ID | CONTROLLER TYPE | COUNTRY | COMPANY |
|---|---|---|---|---|
| C987654321 | aaabbbccc0 | FIRST-TYPE CONTROLLER | COUNTRY K | COMPANY D |
| C789456123 | 111222333z | SECOND-TYPE CONTROLLER | COUNTRY D | COMPANY E |

| CONTROLLER ID 1360 | CONTROLLER TYPE 1370 | CONTROLLER CERTIFICATE ID 1380 | DEVICE ID 1310 | DEVICE CERTIFICATE ID 1320 | TYPE 1330 | COUNTRY 1340 | COMPANY 1350 |
|---|---|---|---|---|---|---|---|
| S321654987 | FIRST-TYPE CONTROLLER | S321654987 | P123456789 | abcdef1234 | AIR CONDITIONER | COUNTRY L | COMPANY A |
| | | | S321654987 | 1a2b3c4d5e | TELEVISION SET | COUNTRY M | COMPANY B |
| | | | T456789012 | 06zyx03qrs | WASHING MACHINE | COUNTRY N | COMPANY C |
| ⋮ | ⋮ | ⋮ | ⋮ | ⋮ | ⋮ | ⋮ | ⋮ |

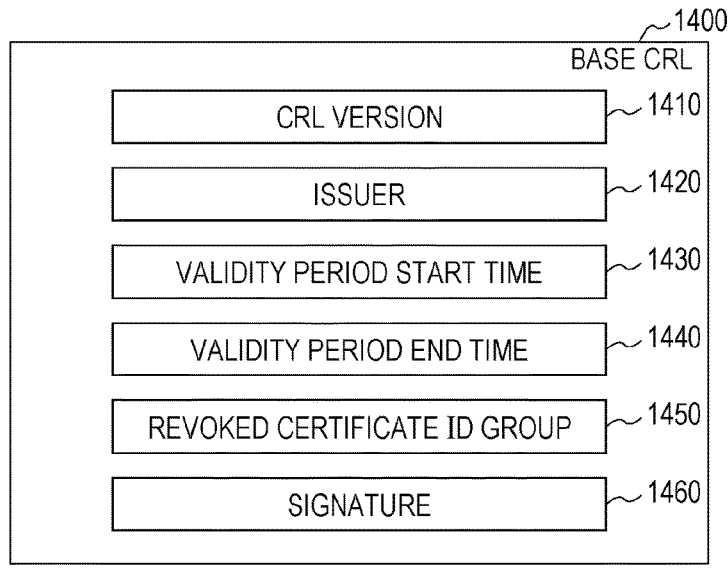

| REVOKED CERTIFICATE ID | TYPE | COUNTRY | COMPANY |
|---|---|---|---|
| abcdef1234 | AIR CONDITIONER | COUNTRY L | COMPANY A |
| abcdef1235 | AIR CONDITIONER | COUNTRY L | COMPANY A |
| abcdef1236 | AIR CONDITIONER | COUNTRY L | COMPANY A |
| ... | ... | ... | ... |
| xyzstuabcd | REFRIGERATOR | COUNTRY Z | COMPANY Y |
| xyzstuabce | REFRIGERATOR | COUNTRY Z | COMPANY Y |
| xyzstuabcf | REFRIGERATOR | COUNTRY Z | COMPANY Y |
| ... | ... | ... | ... |
| 321efg9876 | FIRST-TYPE CONTROLLER | COUNTRY F | COMPANY Q |
| 321efg9877 | FIRST-TYPE CONTROLLER | COUNTRY F | COMPANY Q |
| 321efg9878 | FIRST-TYPE CONTROLLER | COUNTRY F | COMPANY Q |
| ... | ... | ... | ... |

FIG. 25

NET HOME APPLIANCE SERVICE

ACCOUNT: MR. B-TARO A-YAMA

YOU ARE PURCHASING THIS DEVICE

TV

WHICH DEVICE(S) DO YOU OWN? PLEASE CHECK (YOU CAN CHECK MULTIPLE BOXES)

- ☑ TV
- ☑ REFRIGERATOR
- ☑ PC
- ☐ DIGITAL CAMERA
- ⋮

- ☑ BD/DVD RECORDER
- ☑ WASHING MACHINE
- ☐ STORAGE BATTERY
- ☐ NETWORK CAMERA
- ⋮

- ☐ CD PLAYER
- ☑ AIR CONDITIONER
- ☐ SOLAR POWER GENERATION
- ☐ DRYER
- ⋮

[PURCHASE]　[CANCEL]

| USER ID | DEVICE No. | TYPE | COUNTRY | COMPANY |
|---|---|---|---|---|
| aaa@bbb.com | P123456789 | AIR CONDITIONER TYPE | COUNTRY L | COMPANY A |
| | S321654987 | TELEVISION SET TYPE | COUNTRY M | COMPANY B |
| | T456789012 | WASHING MACHINE TYPE | COUNTRY N | COMPANY C |
| | ... | ... | ... | ... |
| ... | ... | ... | ... | ... |

2610  2620  2630  2640  2650

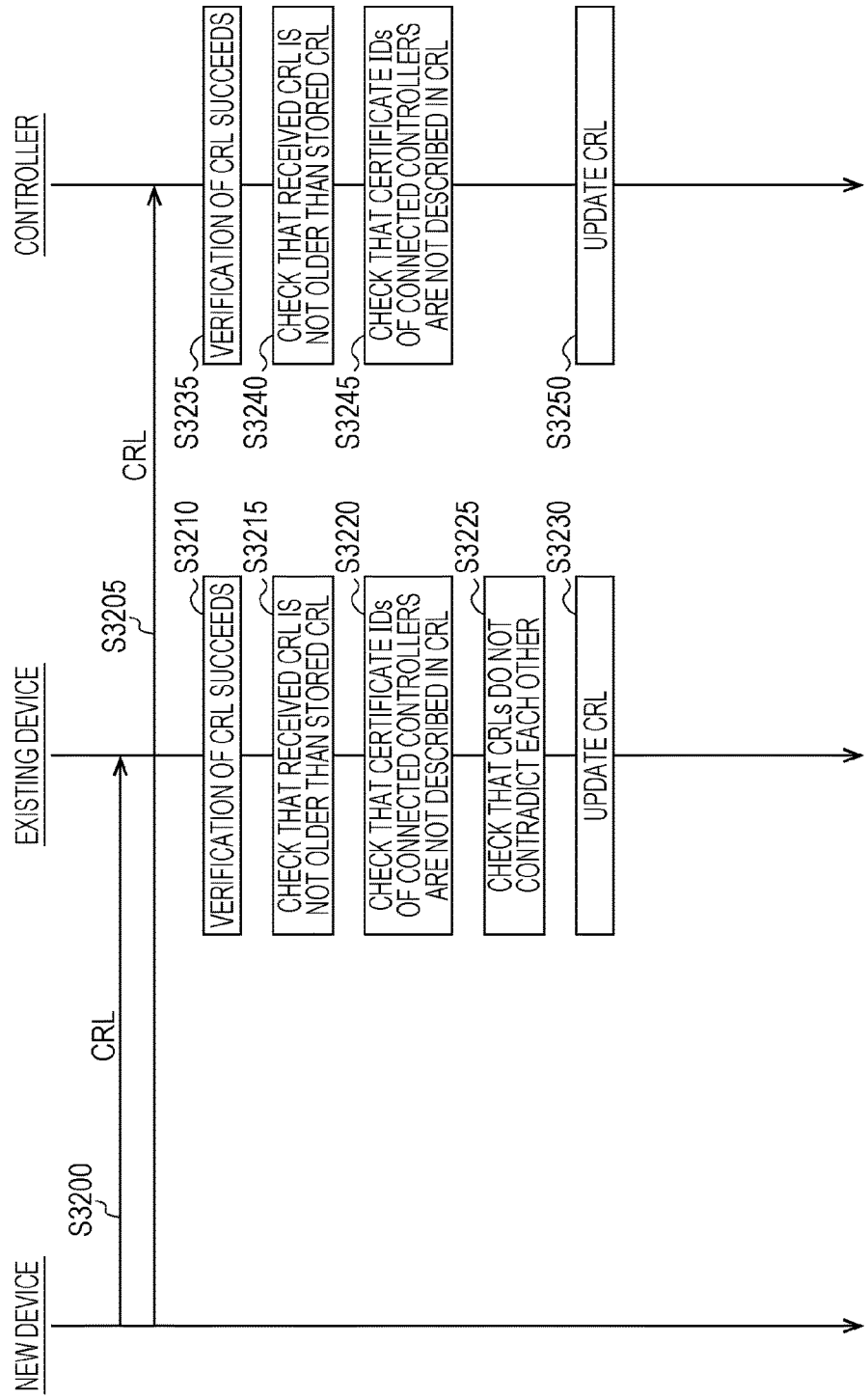

AUTHENTICATION METHOD

BACKGROUND

1. Technical Field

The present disclosure relates to an authentication method for authenticating devices.

2. Description of the Related Art

During these years, a system has been examined in which devices installed in a household, such as home appliances and audiovisual (AV) devices, are connected to a home area network (HAN) and the devices can communicate with one another and with a server and the like outside the HAN.

In such a system, if an unauthorized device is mixed in the devices connected to the HAN, the unauthorized device might perform a malicious process, that is, for example, the unauthorized device might obtain information from another device connected to the HAN and transmit the information to the outside of the HAN.

In such a system, therefore, the validity of the devices connected to the HAN need to be checked in order to assure the safety of the system.

An authentication technique performed on the basis of a public key infrastructure (PKT) is currently known as a technique for checking the validity of devices (e.g., refer to Atsuko Miyaji and Hiroaki Kikuchi, "IT Text Information Security" Ohmsha, October 2003 and the like).

In the authentication based on the PKI, the validity of a target device is checked using a private key and a public key certificated issued by a certification authority.

If a private key might have leaked to a third party, the certification authority performs a process for revoking a public key certificate corresponding to the private key and distributes a certificate revocation list (CRL), which is a list of public key certificate identifiers (IDs; identification information) regarding revoked public key certificates (e.g., refer to National Security Agency, "Suite B Implementer's Guide to FIPS 186-3 (ECDSA)", [online], Feb. 3, 2010, [Retrieved on Jun. 24, 2014], Internet <URL: http://www.nsa.gov/ia/_files/ecdsa.pdf). An authentication person, who checks the validity of a device, carries out, when performing authentication, a search to determine whether a public key certificate ID of a public key certificate of a target device is described in the CRL distributed from the certification authority. If so, the person determines that the device is not valid and a result of the authentication is negative.

Examples of the related art include the following: Wi-Fi Alliance, "Wi-Fi CERTIFIED Wi-Fi Protected Setup: Easing the User Experience for Home and Small Office Wi-Fi® Networks (2010)", [online], December 2010, [Retrieved on Jun. 24, 2014], Internet <URL: http://www.wi-fi.org/ja/file/wi-fi-certified-wi-fi-protected-setup % E2%84% A2-easing-the-user-experience-for-home-and-small-office-wi>; Elaine Barker and three other authors, NIST Special Publication 800-56A Revision 2, "Recommendation for Pair-Wise Key-Establishment Schemes Using Discrete Logarithm Cryptography", [online], May 13, 2013, National Institute of Standards and Technology, [Retrieved on Jun. 24, 2014], Internet <URL: http://nvlpubs.nist.gov/nistpubs/SpecialPublications/NIST.SP.800-56Ar2.pdf>; and D. Forsberg and four other authors, RFC5191, "Protocol for Carrying Authentication for Network Access (PANA)", [online], May 2008, Internet Engineering Task Force, [Retrieved on Jun. 24, 2014], Internet <URL: http://www.rfc-editor.org/rfc/pdfrfc/rfc5191.txt.pdf>.

SUMMARY

The above existing system requires further improvements.

In one general aspect, the techniques disclosed here feature an authentication method for at least one of a plurality of devices connected to a home area network, a first device among the plurality of devices having a function of communicating with a server outside the home area network. The authentication method includes transmitting, by the first device, attribute information regarding a second device among the plurality of devices to the server, receiving, by the first device, a certificate revocation list generated on the basis of the transmitted attribute information and including identification information and the attribute information regarding the second device among the plurality of devices from the server, checking, by the first device, validity of the second device using the received certificate revocation list, and revoking, with the first device, the second device if a result of the checking of the validity is negative.

According to the present invention, further improvements can be achieved.

It should be noted that these general or specific embodiments may be implemented as a system, an apparatus, an integrated circuit, a computer program, or a recording medium, or may be implemented as any selective combination of the system, the apparatus, the integrated circuit, the computer program, and the recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 13 is a data configuration diagram of device information;

FIG. 14 is a data configuration diagram of a base CRL;

FIG. 15 is a data configuration diagram of CRL issuance information;

FIG. 25 is a diagram illustrating a web screen displayed on a personal computer (PC) that accesses a device purchase site;

FIG. 26 is a data configuration diagram of a device management table;

FIG. 32 is a sequence diagram of the process for updating CRLs at the purchase of a device.

DETAILED DESCRIPTION

Figure 1:
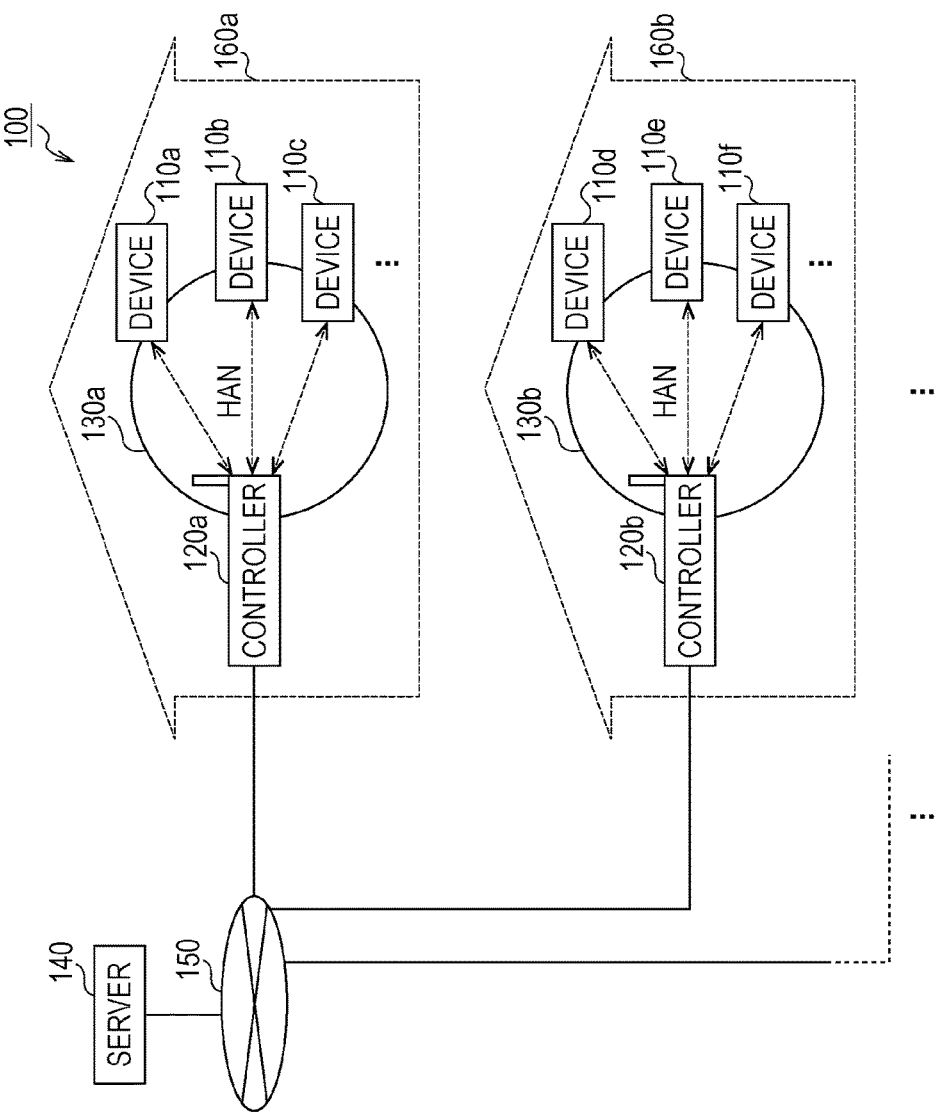
FIG. 1 is a system configuration diagram illustrating the configuration of an authentication system.

Underlying Knowledge Forming Basis of the Present Disclosure

As devices that can be connected to a HAN, various devices such as home appliances and AV devices installed in a household are assumed. The number of public key certificate IDs of revoked public key certificates to be described in a CRL in a present system is therefore larger than in a CRL intended for certain devices such as Blu-ray Disc (BD) (registered trademark) players.

When the number of public key certificate IDs of revoked public key certificates described in a CRL is large, the amount of processing relating to a search, which is carried out to check the validity of a device, for determining whether a public key certificate ID of a public key certificate of a device to be authenticated is described in the CRL becomes large. In addition, since the data size of the CRL becomes large, if a storage capacity of each device is small, the capacity is undesirably exceeded, and each device cannot store a necessary CRL.

The present disclosure is established in order to solve these problems and provides an authentication method in which, even if the number of revoked public key certificate IDs described in a CRL is relatively large, the validity of a device to be authenticated is checked while somewhat suppressing the amount of processing relating to a search, which is carried out to check the validity of a device, for determining whether a public key certificate ID of a public key certificate of the device is described in the CRL. If a result is negative, the device can be revoked.

The present inventors have conceived aspects of the present disclosure on the basis of the above examination.

An authentication method according to an aspect of the present disclosure is an authentication method for at least one of a plurality of devices connected to a home area network, a first device among the plurality of devices having a function of communicating with a server outside the home area network. The authentication method includes transmitting, by the first device, attribute information regarding a second device among the plurality of devices to the server, receiving, by the first device, a certificate revocation list generated on the basis of the transmitted attribute information and including identification information and the attribute information regarding the second device among the plurality of devices from the server, checking, by the first device, validity of the second device using the received certificate revocation list, and revoking, with the first device, the second device if a result of the checking of the validity is negative.

When carrying out a search for determining whether a public key certificate ID of a public key certificate of the second device is described in the CRL, the first device can use the attribute information regarding the second device included in the CRL. As a result, the amount of processing relating to the search can be somewhat suppressed.

By using this authentication method, even if the number of public key certificate IDs of public key certificates described in a CRL is relatively large, the validity of a device to be authenticated can be authenticated while somewhat suppressing the amount of processing relating to a search, which is carried out to check the validity of a device, for determining whether a public key certificate ID of the device is described in the CRL. If a result is negative, the device can be revoked.

First Embodiment

Outline

An authentication system including a server that issues a CRL, controllers connected to the server through a network, and devices connected to the controllers through HANs will be described hereinafter as an aspect of an authentication method according to the present disclosure.

In this authentication system, the server issues, to a controller, a CRL including identification information and attribute information regarding the controller and the devices connected to the HAN to which the controller is connected. The identification information is, for example, a controller ID, device IDs, certificate IDs, and the like. The attribute information is, for example, types, producing countries, manufacturers, and the like.

A controller obtains a CRL issued by the server and checks the validity of a device connected to a HAN to which the controller is connected using the obtained CRL. If a result is negative, the controller revokes the device.

A device obtains a CRL issued by the server through a controller connected to a HAN to which the device is connected and checks the validity of the controller using the obtained CRL. If a result is negative, the device revokes the controller.

Details of the authentication system will be described hereinafter with reference to the drawings.

Configuration

FIG. 1 is a system configuration diagram illustrating the configuration of an authentication system 100.

As illustrated in the figure, the authentication system 100 includes devices 110*a* to 110*f*, controllers 120*a* and 120*b*, HANs 130*a* and 130*b*, a server 140, and a network 150.

Among these, the devices 110*a* to 110*c*, the controller 120*a*, and the HAN 130*a* are arranged in a household 160*a*, and the devices 110*d* to 110*f*, the controller 120*b*, and the HAN 130*b* are arranged in a household 160*b*.

Although an example in which a HAN is installed in a household is illustrated in FIG. 1, a plurality of HANs may be installed in a household, instead.

In addition, although an example in which only one controller is connected to a HAN is illustrated in FIG. 1, a plurality of controllers may be connected to a HAN, instead.

The HANs 130a and 130b are networks constructed in the households and realized wirelessly or by wire and have a function of relaying communication between the devices connected thereto.

The controller 120a and the devices 110a to 110c are connected to the HAN 130a, and the controller 120b and the devices 110d to 110f are connected to the HAN 130b.

In the following description, the HANs 130a and 130b will be simply referred to as HANs 130 unless the HANs 130a and 130b need to be explicitly distinguished from each other.

The network 150 is a network such as the Internet constructed between households, companies, or the like and realized wirelessly or by wire and has a function of relaying communication between the devices connected thereto.

The server 140 and the controllers 120a and 120b are connected to the network 150.

The controllers 120a and 120b are connected to the HANs 130 and the network 150 and have (1) a server communication function of communicating with the server 140, (2) a device communication function of communicating with other devices connected to the HANs 130 to which the controllers 120a and 120b are connected, (3) a device control function of controlling the devices 110 connected to the HANs 130 to which the controllers 120a and 120b are connected, and (4) a device authentication function of checking the validity of the devices 110 connected to the HANs 130 to which the controllers 120a and 120b are connected.

In the following description, the controllers 120a and 120b will be simply referred to as controllers 120 unless the controllers 120a and 120b need to be explicitly distinguished from each other.

Figures 2, 3:
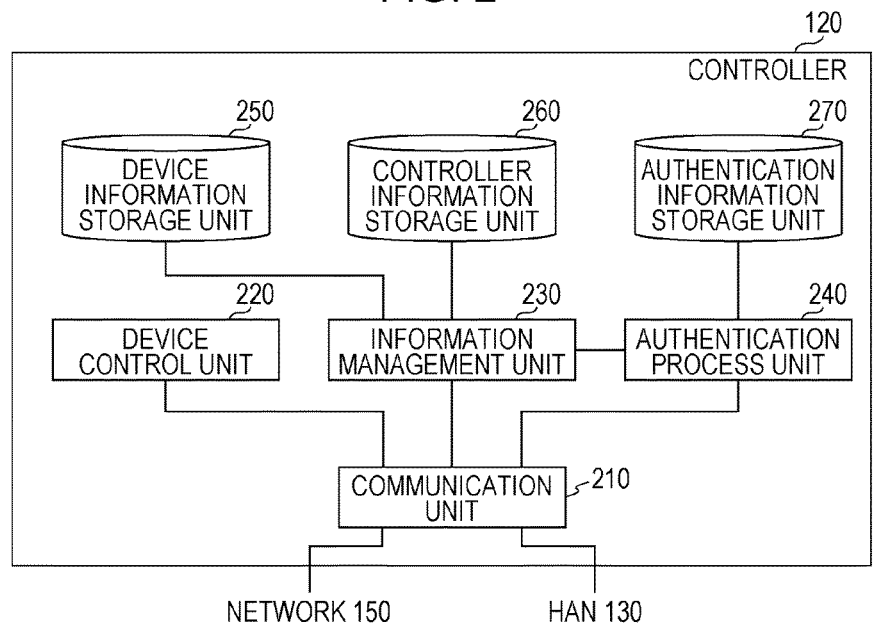
FIG. 2 is a block diagram illustrating the functional configuration of a controller.
FIG. 3 is a data configuration diagram of device information.

FIG. 2 is a block diagram illustrating the functional configuration of a controller 120.

As illustrated in the figure, the controller 120 includes a communication unit 210, a device control unit 220, an information management unit 230, an authentication process unit 240, a device information storage unit 250, a controller information storage unit 260, and an authentication information storage unit 270.

The communication unit 210 is realized by a processor that executes a program, a communication large scale integration (LSI) circuit having a communication function, and a memory, for example, and connected to the device control unit 220, the information management unit 230, the authentication process unit 240, the network 150, and a HAN 130. The communication unit 210 has a function of communicating with the server 140 through the network 150 and a function of communicating with devices connected to the HAN 130 through the HAN 130.

When communicating with the server 140, the communication unit 210 performs secure sockets layer (SSL) communication. A certificate and the like necessary for the SSL communication are stored in the communication unit 210.

The device control unit 220 is realized by a processor that executes a program and a memory, for example, and connected to the communication unit 210. The device control unit 220 has a function of, if the communication unit 210 receives a device control signal for controlling a device 110 transmitted from the server 140, generating a device control command for controlling the device to be controlled on the basis of the device control signal and a function of, if the device control command is generated, causing the communication unit 210 to transmit the device control command to the target device 110.

The device information storage unit 250 is realized by a memory, for example, and connected to the information management unit 230. The device information storage unit 250 has a function of storing device information.

FIG. 3 is a data configuration diagram of device information 300, which is an example of the device information stored in the device information storage unit 250.

As illustrated in the figure, the device information 300 is configured by associating device IDs 310, certificate IDs 320, types 330, countries 340, and companies 350 with one another.

The device IDs 310 are identifiers identifying the devices 110 connected to the HAN 130 to which the controller 120 is connected.

The certificate IDs 320 are identifiers identifying public key certificates issued by a certification authority while being associated with private keys stored in the devices 110 identified by the device IDs 310 associated therewith.

The types 330 are one of the pieces of attribute information indicating attributes of the devices 110 identified by the device IDs 310 associated therewith and information indicating types. The types 330 may be, for example, an air conditioner, a television set, and a washing machine, and the like.

The countries 340 are one of the pieces of attribute information indicating the attributes of the devices 110 identified by the device IDs 310 associated therewith and information indicating producing countries. The countries 340 may be, for example, country names, codes identifying countries, or the like.

Although the countries 340 are information indicating producing countries here, the countries 340 may be sale countries, available countries, or the like in another example. The same holds for "countries" referred to in the following description.

The companies 350 are one of the pieces of attribute information indicating the attributes of the devices 110 identified by the device IDs 310 associated therewith and information indicating manufacturers. The companies 350 may be, for example, company names, codes identifying companies, or the like.

Although the companies 350 are information indicating manufacturers here, the companies 350 may be retailer, management companies, or the like in another example. The same holds for "companies" referred to in the following description.

Returning to FIG. 2, the configuration of the controller 120 will be described.

The controller information storage unit 260 is realized by a memory, for example, and connected to the information management unit 230. The controller information storage unit 260 has a function of storing controller information.

Figures 4, 5:
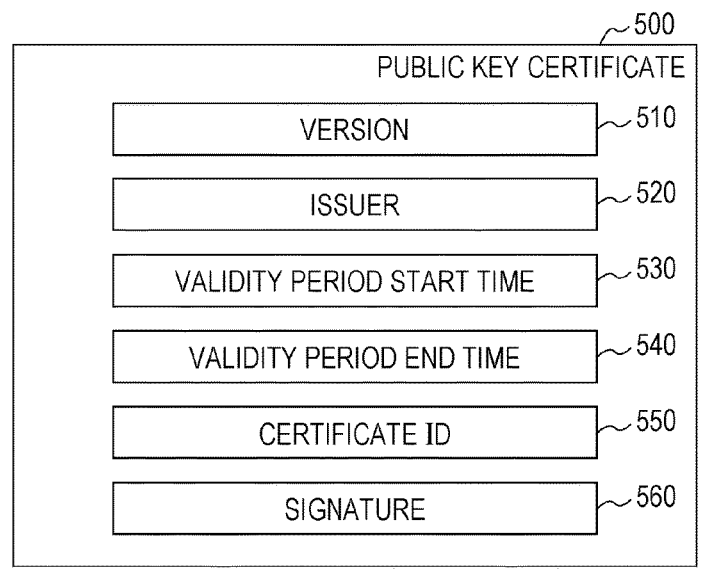
FIG. 4 is a data configuration diagram of controller information.
FIG. 5 is a data configuration diagram of a public key certificate.

FIG. 4 is a data configuration diagram of controller information 400, which is an example of the controller information stored in the controller information storage unit 260.

As illustrated in the figure, the controller information 400 is configured by associating a controller ID 410, a certificate ID 420, a controller type 430, a country 440, and a company 450 with one another.

The controller ID 410 is an identifier identifying the controller 120, that is, the controller itself.

The certificate ID 420 is an identifier identifying a public key certificate issued by the certification authority while being associated with a private key stored in the controller 120.

The controller type 430 is one of the pieces of attribute information indicating attributes of the controller 120 and information indicating a controller type. The controller type here indicates the type of controller and may be, for example, a controller-only type having only functions as a controller, a television function incorporated type also having functions of a television set, or the like. In the present embodiment, it is assumed, for example, that there are first-type controllers and second-type controllers.

The country 440 is one of the pieces of attribute information indicating the attributes of the controller 120 and information indicating a producing country. The country 440 may be, for example, a country name, a code identifying a country, or the like.

The company 450 is one of the pieces of attribute information indicating the attributes of the controller 120 and information indicating a manufacturer. The company 450 may be, for example, a company name, a code identifying a company, or the like.

Returning to FIG. 2, the configuration of the controller 120 will be described.

The authentication information storage unit 270 is realized by a memory, for example, and connected to the authentication process unit 240. The authentication information storage unit 270 has a function of storing private keys, public key certificates, and a CRL. Among these, the private keys are embedded in a read-only memory (ROM) or a nonvolatile memory when the controller 120 is manufactured so that the private keys are not read or updated from outside the controller 120. The CRL is a CRL issued by the server 140.

FIG. 5 is a data configuration diagram of a public key certificate 500, which is an example of a public key certificate stored in the authentication information storage unit 270.

As illustrated in the figure, the public key certificate 500 is configured by a version 510, an issuer 520, a validity period start time 530, a validity period end time 540, a certificate ID 550, and a signature 560.

Figure 6:
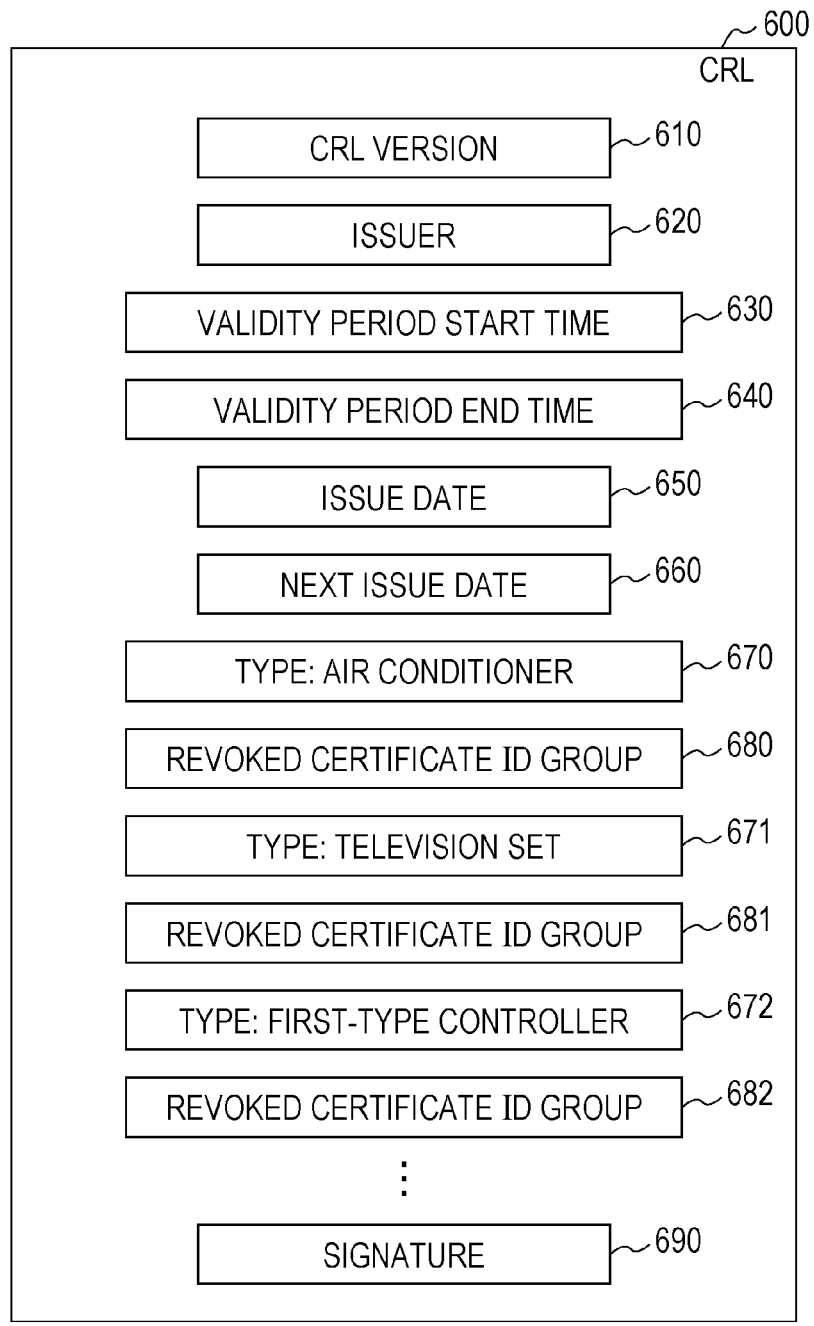
FIG. 6 is a data configuration diagram of a CRL.

FIG. 6 is a data configuration diagram of a CRL 600, which is an example of the CRL stored in the authentication information storage unit 270.

As illustrated in the figure, the CRL 600 is configured by a CRL version 610, an issuer 620, a validity period start time 630, a validity period end time 640, an issue date 650, a next issue data 660, types 670 to 672, revoked certificate ID groups 680 to 682, and a signature 690.

The types 670 to 672 indicate types of devices connected to the HAN or controller types of controllers connected to the HAN. The types may be, for example, an air conditioner, a television set, the first-type controller, and the like.

Here, the types included in the CRL 600 are limited to types of devices 110 connected to the HAN 130 to which the controller 120 is connected and controller types of controllers 120 connected to the HAN 130 to which the controller 120 is connected.

This is because when issuing the CRL 600 to the controller 120, the server 140 limits the types included in the CRL 600 to the types of devices 110 connected to the HANs 130 to which the controller 120 is connected and the controller types of controllers 120 connected to the HANs 130 to which the controller 120 is connected (details will be described later).

The revoked certificate ID groups 680 to 682 are each associated with any of the types 670 to 672. The revoked certificate ID groups 680 to 682 consist of revoked public key certificate IDs of public key certificates of the types of devices or controllers associated therewith subjected to a revocation process performed by the certification authority.

Here, the revoked certificate ID groups included in the CRL 600 are limited to ones associated with the types included in the CRL 600.

This is because when issuing the CRL 600 to the controller 120, the server 140 limits the revoked certificate ID groups included in the CRL 600 to those associated with the types included in the CRL 600 (details will be described later).

In the description of the revoked certificate ID groups included in the CRL 600, the revoked certificate ID group 680 is classified into "type: air conditioner 670", the revoked certificate ID group 681 is classified into "type: television set 671", and the revoked certificate ID group 682 is classified into "type: first type controller 672".

The description in which revoked certificate IDs are classified in this manner indicates that, in the CRL 600, revoked certificate IDs corresponding to devices having an attribute of the type of air conditioner, devices having an attribute of the type of television set, and devices having an attribute of the type of first-type controller are classified into different tree structures.

The CRL 600 is an example of a case in which attribute information regarding the devices 110 or the controllers 120 included therein is the type of devices 110 or controllers 120.

Figure 7:
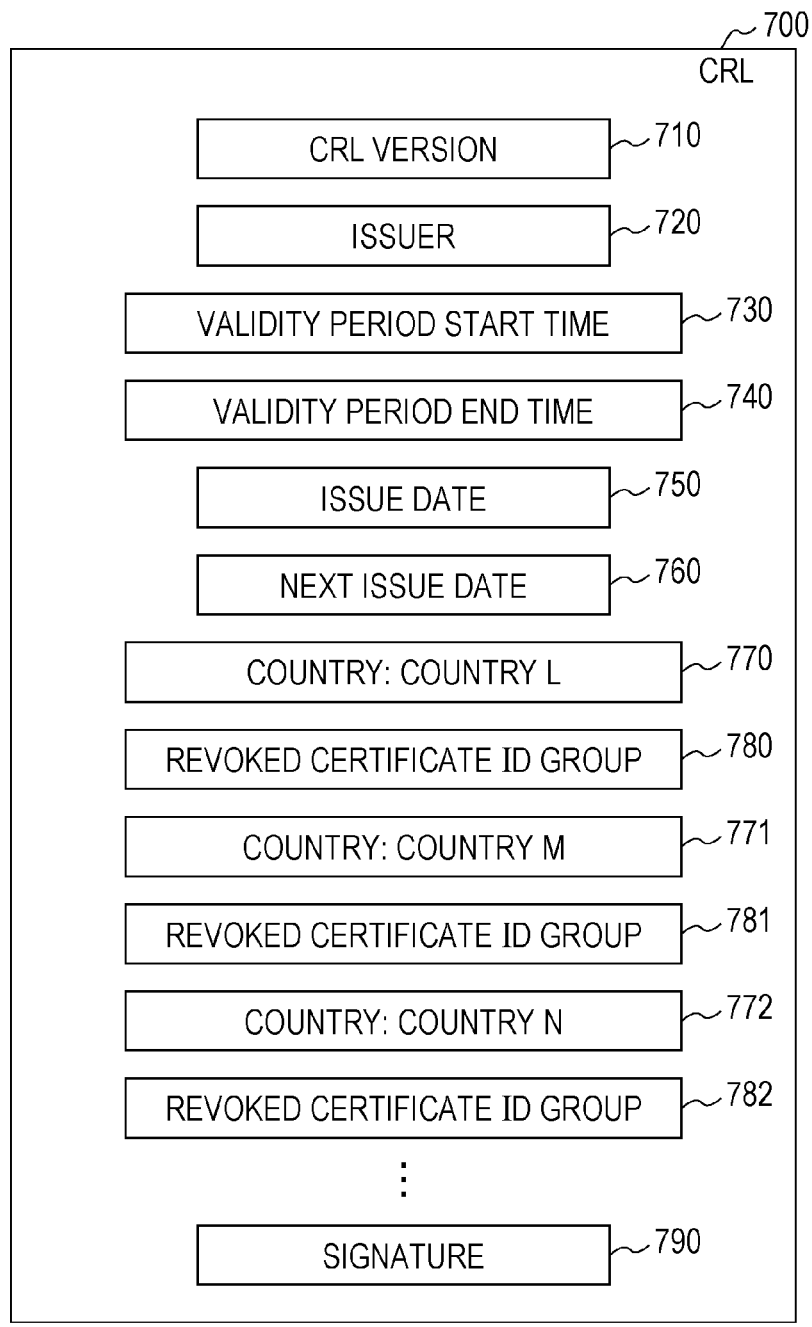
FIG. 7 is a data configuration diagram of a CRL.

FIG. 7 is a data configuration diagram of a CRL 700, which is another example of the CRL stored in the authentication information storage unit 270.

As illustrated in the figure, the CRL 700 is configured by a CRL version 710, an issuer 720, a validity period start time 730, a validity period end time 740, an issue date 750, a next issue date 760, countries 770 to 772, revoked certificate ID groups 780 to 782, and a signature 790.

The countries 770 to 772 indicate producing countries of the types of devices or controllers connected to the HAN. The countries 770 to 772 may be, for example, country names, codes identifying countries, or the like.

Here, the countries included in the CRL 700 are limited to countries of the devices 110 connected to the HANs 130 to which the controller 120 is connected and countries of the controllers 120 connected to the HANs 130 to which the controller 120 is connected.

This is because when issuing the CRL 700 to the controller 120, the server 140 limits the countries included in the CRL 700 to the countries of the devices 110 connected to the HAN 130 to which the controller 120 is connected and the countries of the controllers 120 connected to the HAN 130 to which the controller 120 is connected.

The revoked certificate ID groups 780 to 782 are each associated with any of the countries 770 to 772. The revoked certificate ID groups 780 to 782 consist of revoked public key certificate IDs of the devices or controllers produced in the countries associated therewith subjected to the revocation process performed by the certification authority.

Here, the revoked certificate ID groups included in the CRL 700 are limited to ones associated with the countries included in the CRL 700.

This is because when issuing the CRL 700 to the controller 120, the server 140 limits the revoked certificate ID groups included in the CRL 700 to those associated with the countries included in the CRL 700.

The CRL 700 is an example of a case in which the attribute information regarding the devices 110 or the controllers 120 included therein is the countries in which the devices 110 or the controllers 120 have been produced.

Figure 8:
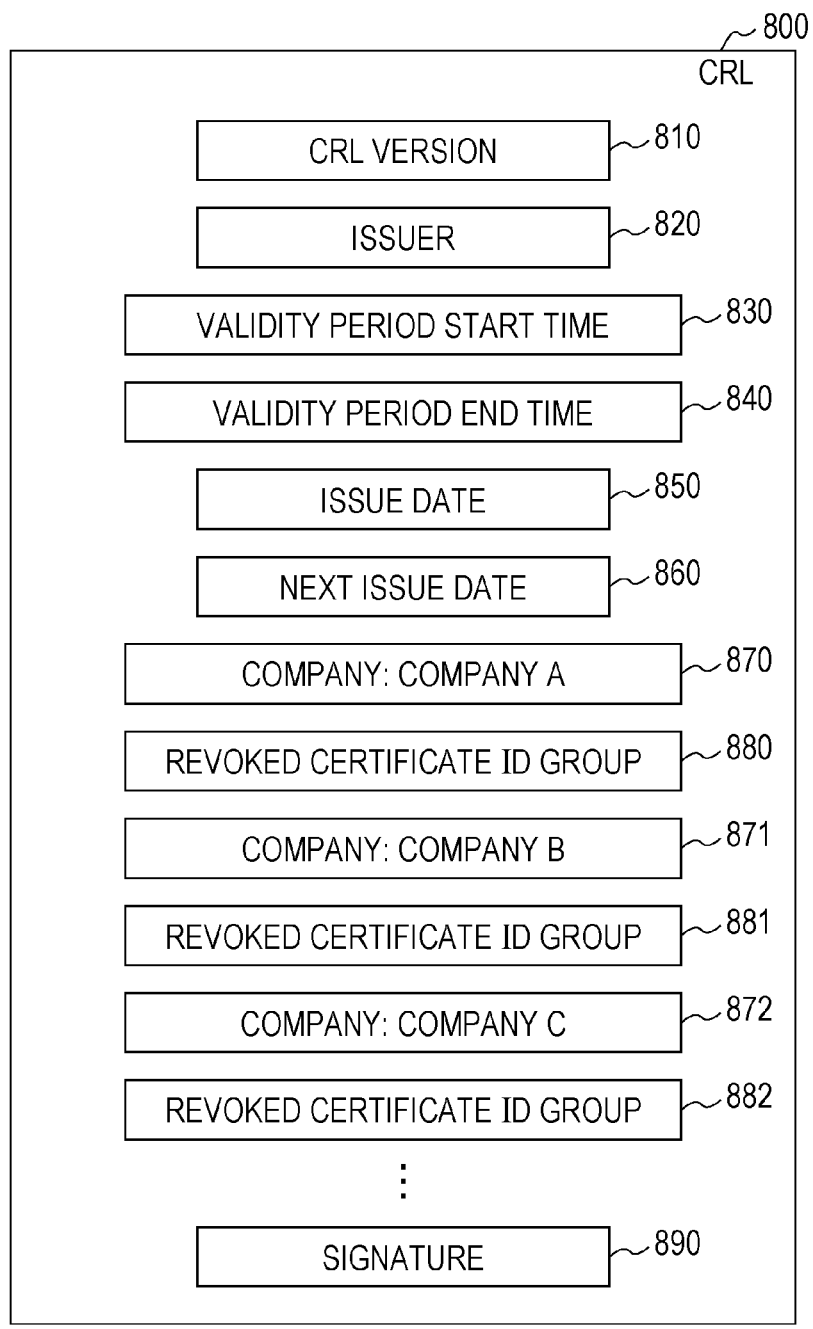
FIG. 8 is a data configuration diagram of a CRL.

FIG. 8 is a data configuration diagram of a CRL 800, which is yet another example of the CRL stored in the authentication information storage unit 270.

As illustrated in the figure, the CRL 800 is configured by a CRL version 810, an issuer 820, a validity period start time 830, a validity period end time 840, an issue date 850, a next issue date 860, companies 870 to 872, revoked certificate ID groups 880 to 882, and a signature 890.

The companies 870 to 872 indicate manufacturers of the devices or the controllers connected to the HAN. The companies 870 to 872 may be, for example, company names, codes identifying companies, or the like.

Here, the companies included in the CRL 800 are limited to companies of the devices 110 connected to the HAN 130 to which the controller 120 is connected and companies of the controllers 120 connected to the HAN 130 to which the controller 120 is connected.

This is because when issuing the CRL 800 to the controller 120, the server 140 limits the companies included in the CRL 800 to the companies of the devices 110 connected to the HAN 130 to which the controller 120 is connected and the companies of the controllers 120 connected to the HAN 130 to which the controller 120 is connected.

The revoked certificate ID groups 880 to 882 are each associated with any of the companies 870 to 872. The revoked certificate ID groups 880 to 882 consist of revoked public key certificate IDs of the devices or controllers manufactured by the companies associated therewith subjected to the revocation process performed by the certification authority.

Here, the revoked certificate ID groups included in the CRL 800 are limited to ones associated with the companies included in the CRL 800.

This is because when issuing the CRL 800 to the controller 120, the server 140 limits the revoked certificate ID groups included in the CRL 800 to those associated with the companies included in the CRL 800.

The CRL 800 is an example of a case in which the attribute information regarding the devices 110 or the controllers 120 included therein is the manufactures by which the devices 110 or the controllers 120 have been manufactured.

In another example of the CRL, the attribute information regarding the devices 110 or the controllers 120 may be combinations of a type, a country, and a company.

In the following description, the CRL stored in the authentication information storage unit 270 is assumed to be the CRL 600, but the same holds even when the CRL stored in the authentication information storage unit 270 is, for example, the CRL 700 or the CRL 800.

Returning to FIG. 2, the configuration of the controller 120 will be described.

The information management unit 230 is realized by a processor that executes a program and a memory, for example, and connected to the communication unit 210, the authentication process unit 240, the device information storage unit 250, and the controller information storage unit 260. The information management unit 230 has a function of controlling the device information storage unit 250, a function of managing the device information 300 stored in the device information storage unit 250, a function of controlling the controller information storage unit 260, and a function of managing the controller information 400 stored in the controller information storage unit 260.

The authentication process unit 240 is realized by a processor that executes a program and a memory, for example, and connected to the communication unit 210, the information management unit 230, and the authentication information storage unit 270. The authentication process unit 240 has a function of controlling the authentication information storage unit 270, a function of managing the CRL 600 stored in the authentication information storage unit 270, and a function of checking the validity of the devices 110 connected to the HAN 130 to which the controller 120 is connected.

Returning to FIG. 1, the configuration of the authentication system 100 will be described.

The devices 110a to 110f are air conditioners, television sets, washing machines, and the like installed in the households, for example, and connected to the HANs 130. The devices 110a to 110f have (1) functions originally provided as devices (e.g., an air conditioning function and the like if the device is an air conditioner), (2) a device communication function of communicating with other devices connected to the HANs 130 to which the devices 110a to 110f are connected, (3) an under-control function of being controlled by the controllers 120 connected to the HANs 130 to which the devices 110a to 110f are connected, and (4) a controller authentication function of checking the validity of the controllers 120 connected to the HANs 130 to which the devices 110a to 110f are connected.

The devices 110a to 110f will be simply referred to as "devices 110" unless the devices 110a to 110f need to be explicitly distinguished from each other.

Figures 9, 10, 11:
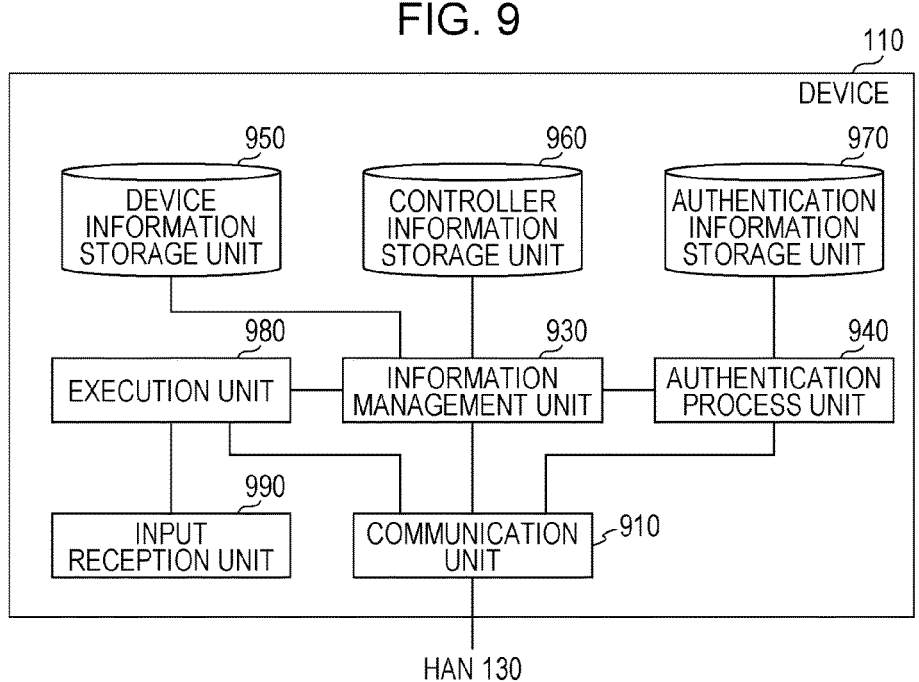
FIG. 9 is a block diagram illustrating the functional configuration of a device.
FIG. 10 is a data configuration diagram of device information.
FIG. 11 is a data configuration diagram of controller information.

FIG. 9 is a block diagram illustrating the functional configuration of a device 110.

As illustrated in the figure, the device 110 includes a communication unit 910, an information management unit 930, an authentication process unit 940, a device information storage unit 950, a controller information storage unit 960, an authentication information storage unit 970, an execution unit 980, and an input reception unit 990.

The communication unit 910 is realized by a processor that executes a program, a communication LSI circuit having a communication function, and a memory, for example, and connected to the execution unit 980, the information management unit 930, the authentication process unit 940, and a HAN 130. The communication unit 910 has a function of communicating with devices connected to the HAN 130 through the HAN 130.

If the communication unit 910 receives a device control command for controlling the device 110, the communication unit 910 transmits the device control command to the execution unit 980.

The input reception unit 990 is realized by a processor that executes a program, a memory, and a user operation reception device, for example, and connected to the execution unit 980. The input reception unit 990 has a function of generating a control command for controlling the device 110 on the basis of an operation performed by the user and received by the user operation reception device and transmitting the control command to the execution unit 980.

The execution unit 980 has a function of realizing functions originally provided for the device 110 as a device (e.g., an air conditioning function of delivering cold air or warm air from a ventilation port in order to change the temperature of a room in which the air conditioner is installed to a set temperature and the like if the device 110 is an air conditioner, or a television reception function of receiving and decoding a television signal, displaying the decoded television signal on a display, and outputting decoded television sound from a speaker and the like if the device 110 is a television set).

If a control command is transmitted to the execution unit 980 from the communication unit 910 or the input reception unit 990, the execution unit 980 performs a process based on the control command.

The device information storage unit 950 is realized by a memory, for example, and connected to the information management unit 930. The device information storage unit 950 has a function of storing device information.

FIG. 10 is a data configuration diagram of device information 1000, which is an example of the device information stored in the device information storage unit 950.

As illustrated in the figure, the device information 1000 is configured by associating a device ID 1010, a certificate ID 1020, a type 1030, a country 1040, and a company 1050 with one another.

The device ID 1010 is an identifier identifying the device 110, that is, the device itself.

The certificate ID 1020 is an identifier identifying a public key certificate ID issued by the certification authority while being associated with a private key stored in the device 110.

The type 1030 is one of pieces of attribute information indicating attributes of the device 110 and information indicating a type. The type 1030 is, for example, an air conditioner, a television set, a washing machine, or the like.

The country 1040 is one of the pieces of attribute information indicating the attributes of the device 110 and information indicating a producing country. The country 1040 is, for example, a country name, a code identifying a country, or the like.

The company 1050 is one of the pieces of attribute information indicating the attributes of the device 110 and information indicating a manufacturer. The company 1050 is, for example, a company name, a code identifying a company, or the like.

Returning to FIG. 9, the configuration of the device 110 will be described.

The controller information storage unit 960 is realized by a memory, for example, and connected to the information management unit 930. The controller information storage unit 960 has a function of storing controller information.

FIG. 11 is a data configuration diagram of controller information 1100, which is an example of the controller information stored in the controller information storage unit 960.

As illustrated in the figure, the controller information 1100 is configured by associating controller IDs 1110, certificate IDs 1120, controller types 1130, countries 1140, and companies 1150 with one another.

The controller IDs 1110 are identifiers identifying controllers 120 connected to a HAN 130 to which the device 110 is connected.

Although this example is an example of a case in which two controllers are connected to the HAN 130 to which the device 110 is connected, the number of controllers connected need not necessarily be limited to two insofar as at least one controller is connected.

The certificate IDs 1120 are identifiers identifying public key certificate IDs issued by the certification authority while being associated with private keys stored in the controllers 120 identified by the controller IDs 1110 associated therewith.

The controller types 1130 are one of pieces of attribute information indicating attributes of controllers 120 identified by the controller IDs 1110 associated therewith and information indicating controller types.

The countries 1140 are one of the pieces of attribute information indicating the attributes of the controllers 120 identified by the controller IDs 1110 associated therewith and information indicating producing countries. The countries 1140 are, for example, country names, codes identifying countries, or the like.

The companies 1150 are one of the pieces of attribute information indicating the attributes of the controllers 120 identified by the controller IDs 1110 associated therewith and information indicating manufacturers. The companies 1150 are, for example, company names, codes identifying companies, or the like.

Returning to FIG. 9, the configuration of the device 110 will be described.

The authentication information storage unit 970 is realized by a memory, for example, and connected to the authentication process unit 940. The authentication information storage unit 970 has a function of storing a private key, a public key certificate, and a CRL. Among these, the private key is embedded in a ROM or a nonvolatile memory when the device 110 is manufactured so that the private key is not read or updated from outside the device 110.

The CRL stored in the authentication information storage unit 970 is the same as the CRL stored in the authentication information storage unit 270 of the controller 120.

Although, like the CRL stored in the authentication information storage unit 270 of the controller 120, the CRL stored in the authentication information storage unit 970 is the CRL 600 illustrated in FIG. 6 in the following description, the same holds when the CRL stored in the authentication information storage unit 970 is the CRL 700 or the CRL 800, for example, insofar as the CRL stored in the authentication information storage unit 970 is the same as the CRL stored in the authentication information storage unit 270 of the controller 120.

The information management unit 930 is realized by a processor that executes a program and a memory, for example, and connected to the communication unit 910, the authentication process unit 940, the device information storage unit 950, and the controller information storage unit 960. The information management unit 930 has a function of controlling the device information storage unit 950, a function of managing the device information 1000 stored in the device information storage unit 950, a function of controlling the controller information storage unit 960, and a function of managing the controller information 1100 stored in the controller information storage unit 960.

The authentication process unit 940 is realized by a processor that executes a program and a memory, for example, and connected to the communication unit 910, the information management unit 930, and the authentication information storage unit 970. The authentication process unit 940 has a function of controlling the authentication information storage unit 970, a function of managing the CRL 600 stored in the authentication information storage unit 970, and a function of checking the validity of the controllers 120 connected to the HAN 130 to which the device 110 is connected.

Returning to FIG. 1, the configuration of the authentication system 100 will be described.

The server 140 is a computer system connected to the network 150 and has (1) a CRL issuing function of issuing a CRL, (2) a controller communication function of communicating with the controllers 120, (3) a device control signal generation function of generating a device control signal for controlling a device 110, and (4) an association function of managing the controllers 120 and the devices 110 by associating the controllers 120 and the devices 110 with each other.

Figure 12:
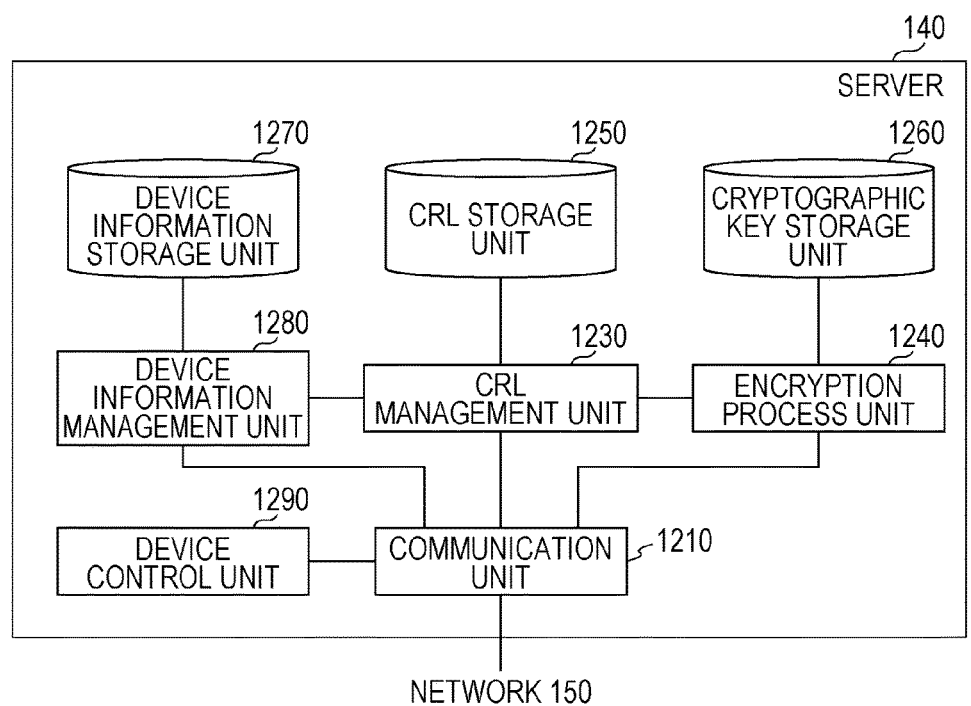
FIG. 12 is a block diagram illustrating the functional configuration of a server.

FIG. 12 is a block diagram illustrating the functional configuration of the server 140.

As illustrated in the figure, the server 140 is configured by a communication unit 1210, a CRL management unit 1230, an encryption process unit 1240, a device information storage unit 1270, a CRL storage unit 1250, a cryptographic key storage unit 1260, a device information management unit 1280, and a device control unit 1290.

The communication unit 1210 is realized by a processor that executes a program, a communication LSI circuit having a communication function, and a memory, for example, and connected to the CRL management unit 1230, the encryption process unit 1240, the device information management unit 1280, the device control unit 1290, and the network 150. The communication unit 1210 has a function of communicating with the devices connected to the network 150.

The device control unit 1290 is realized by a processor that executes a program and a memory, for example, and has a function of generating a device control signal for controlling a device 110 and a function of, after generating the device control signal, causing the communication unit 1210 to transmit the generated device control signal to a controller 120 connected to a HAN 130 to which the target device 110 is connected.

The device information storage unit 1270 is realized by a memory, for example, and connected to the device information management unit 1280. The device information storage unit 1270 has a function of storing device information.

FIG. 13 is a data configuration diagram of device information 1300, which is an example of the device information stored in the device information storage unit 1270.

As illustrated in the figure, the device information 1300 is configured by associating controller IDs 1360, controller types 1370, controller certificate IDs 1380, device IDs 1310, device certificate IDs 1320, types 1330, countries 1340, and companies 1350 with one another.

The controller IDs 1360 are identifiers identifying controllers 120.

The controller types 1370 are one of pieces of attribute information indicating attributes of controllers 120 identified by the controller IDs 1360 associated therewith and information indicating controller types.

Attribute information (e.g., countries, companies, or the like) other than the controller types 1370 may be further associated, or other pieces of attribute information (e.g., countries, companies, or the like) may be associated instead of the controller types 1370.

The controller certificate IDs 1380 are identifiers identifying public key certificates issued by the certification authority while being associated with private keys stored in the controllers 120 identified by the controller IDs 1360 associated therewith.

The device IDs 1310 are identifiers identifying devices 110 connected to HANs 130 to which controllers 120 identified by the controller IDs 1360 associated therewith.

The device certificate IDs 1320 are identifiers identifying public key certificates issued by the certification authority while being associated with private keys stored in devices 110 identified by the device IDs 1310 associated therewith.

The types 1330 are one of the pieces of attribute information indicating the attributes of the devices 110 identified by the device IDs 1310 associated therewith and information indicating types.

The countries 1340 are one of the pieces of attribute information indicating the attributes of the devices 110 identified by the device IDs 1310 associated therewith and information indicating producing countries.

The companies 1350 are one of the pieces of attribute information indicating the attributes of the devices 110 identified by the device IDs 1310 associated therewith and information indicating manufacturers.

Returning to FIG. 12, the configuration of the server 140 will be described.

The CRL storage unit 1250 is realized by a memory, for example, and connected to the CRL management unit 1230. The CRL storage unit 1250 has a function of storing a base CRL and CRL issuance information to be distributed.

FIG. 14 is a data configuration diagram of a base CRL 1400, which is an example of the base CRL stored in the CRL storage unit 1250.

As illustrated in the figure, the base CRL 1400 is configured by a CRL version 1410, an issuer 1420, a validity period start time 1430, a validity period end time 1440, a revoked certificate ID group 1450, and a signature 1460.

The revoked certificate ID group 1450 includes IDs of all public key certificates subjected to the revocation process performed by the certification authority in the past.

FIG. 15 is a data configuration diagram of CRL issuance information 1500, which is an example of the CRL issuance information stored in the CRL storage unit 1250.

As illustrated in the figure, the CRL issuance information 1500 is configured by associating revoked certificate IDs 1520, types 1530, countries 1540, and companies 1550 with one another.

The revoked certificate IDs 1520 are identifiers identifying public key certificates subjected to the revocation process performed by the certification authority.

The revoked certificate IDs 1520 include IDs of all public key certificates subjected to the revocation process performed by the certification authority in the past.

The types 1530 are information indicating types of devices or controller types of controllers for which the public key certificates identified by the revoked certificate IDs 1520 associated therewith are issued.

The countries 1540 are information indicating producing countries of the devices or the controllers for which the public key certificates identified by the revoked certificate IDs 1520 associated therewith are issued.

The companies 1550 are information indicating manufacturers of the devices or the controllers for which the public key certificates identified by the revoked certificate IDs 1520 associated therewith are issued.

Returning to FIG. 12, the configuration of the server 140 will be described.

The cryptographic key storage unit 1260 is realized by a memory, for example, and connected to the encryption process unit 1240. The cryptographic key storage unit 1260 stores a private key for a signature. The private key is embedded in a ROM or a nonvolatile memory when the server 140 is manufactured so that the private key is not read or updated from outside the server 140.

The device information management unit 1280 is realized by a processor that executes a program and a memory, for example, and connected to the communication unit 1210, the CRL management unit 1230, and the device information storage unit 1270. The device information management unit 1280 has a function of controlling the device information storage unit 1270, a function of associating a controller 120 and devices 110 connected to a HAN 130 to which the controller 120 is connected with each other, and a function of updating and managing the device information 1300 on the basis of the association between the controller 120 and the devices 110.

The encryption process unit 1240 is realized by a processor that executes a program and a memory, for example, and connected to the communication unit 1210, the CRL management unit 1230, and the cryptographic key storage unit 1260. The encryption process unit 1240 has a function of signing a CRL using the cryptographic key stored in the cryptographic key storage unit 1260.

The CRL management unit 1230 is realized by a processor that executes a program and a memory, for example, and connected to the communication unit 1210, the device information management unit 1280, the encryption process unit 1240, and the CRL storage unit 1250. The CRL management unit 1230 has a function of controlling the CRL storage unit 1250, a function of updating and managing the base CRL 1400 and the CRL issuance information stored in the CRL storage unit 1250, and a function of issuing a CRL to be distributed to the controllers 120.

Operation performed by the authentication system 100 configured as above will be described hereinafter with reference to the drawings.

Operations

The authentication system 100 performs a process for registering a device and a process for updating device CRLs as characteristic operations thereof.

These processes will be sequentially described hereinafter.

Process for Registering Device

The process for registering a device is a process cooperatively performed by the device 110, the controller 120, and the server 140 and a process in which, after a new device 110 is newly connected to a HAN 130, the server 140 registers the new device 110. Here, the registration of a new device 110 performed by the server 140 refers to addition of information regarding the new device 110 to the device information 1300 stored in the device information storage unit 1270 to update the device information 1300.

Figure 16:
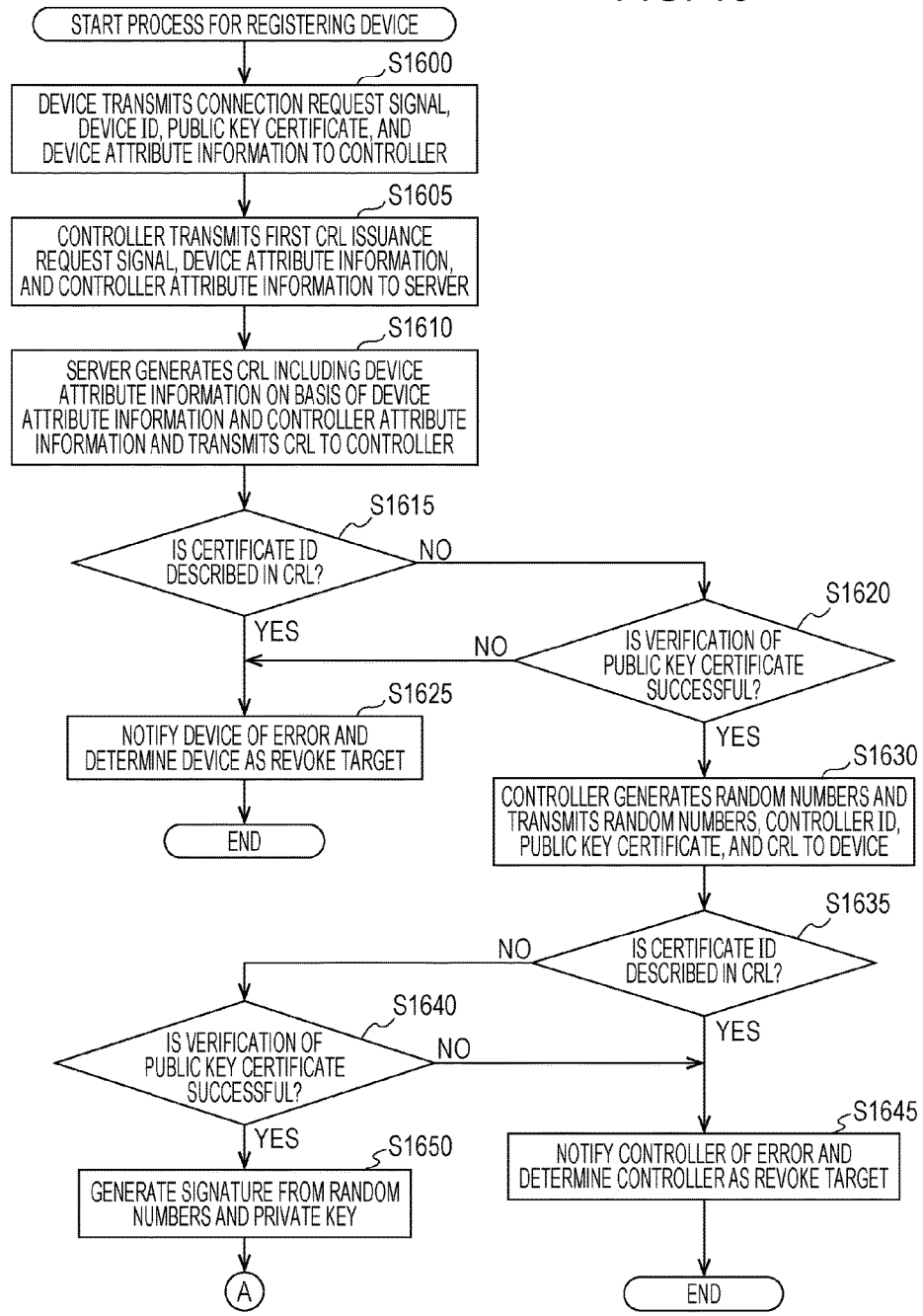
FIG. 16 is a first flowchart of a process for registering a device.
Figure 17:
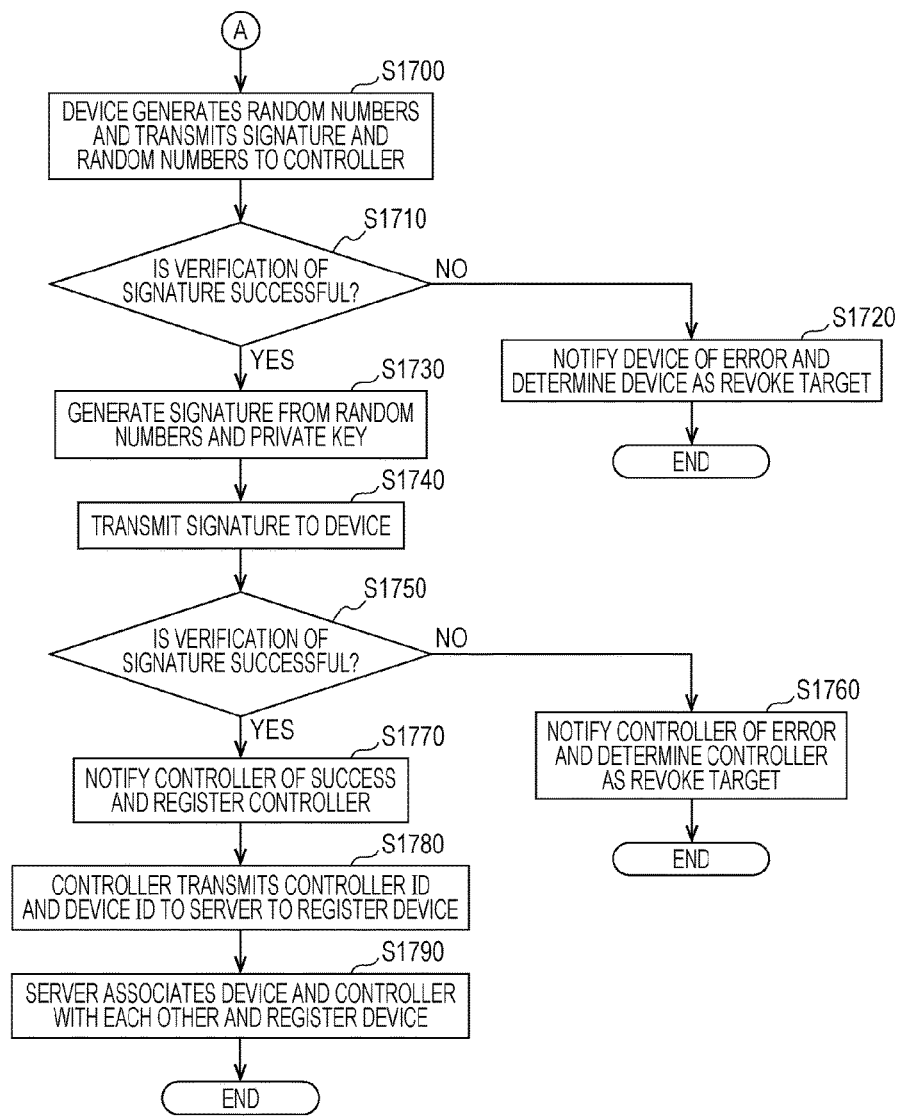
FIG. 17 is a second flowchart of the process for registering a device.

FIGS. 16 and 17 are flowcharts illustrating the process for registering a device.

The process for registering a device starts when a new device 110 is newly connected to a HAN 130.

The new device 110 will be referred to as a "device 110X" hereinafter.

After the process for registering a device starts, the device 110X transmits a connection request signal indicating that the device 110X has been newly connected to the HAN 130, a device ID thereof, a public key certificate stored therein, and device attribute information, which is attribute information thereon, to a controller 120 connected to the HAN 130 to which the device 110X is connected (hereinafter simply referred to as a "controller 120") (step S1600). The device attribute information is assumed to be a type of device 110 and a CRL stored in the device 110X and the controller 120 is assumed to be the CRL 600 here. The same holds when the device attribute information is a country of the device 110X and the CRL stored in the device 110X and the controller 120 is the CRL 700 or when the device attribute information is a company of the device 110X and the CRL stored in the device 110X and the controller 120 is the CRL 800.

Upon receiving the connection request signal, the device ID, the public key certificate, and the device attribute information transmitted from the device 110X, the controller 120 transmits, to the server 140, a first CRL issuance request signal indicating that the controller 120 is requesting issuance of a new CRL, the received device attribute information, and controller attribute information, which is attribute information thereon (step S1605). The controller attribute information is assumed to be a controller type of controller 120 here. The same holds when the controller attribute information is a country of the controller 120 or when the controller attribute information is a company of the controller 120.

Upon receiving the first CRL issuance request signal, the device attribute information, and the controller attribute information transmitted from the controller 120, the server 140 generates a CRL 600 (the generated CRL 600 will be referred to as a "CRL 600X" hereinafter) including only the type of device 110X and the controller type of controller 120 as attribute information and a revoked certificate ID group only for the type of device 110X and the controller type of controller 120 on the basis of the received device attribute information and controller attribute information and transmits the generated CRL 600X to the controller 120 (step S1610).

Since the CRL 600X is described only for the revoked certificate ID group for the type of device 110X and the controller type of controller 120, the number of revoked certificate IDs is smaller than in the base CRL 1400. When a search is carried out using a revoked certificate ID, therefore, the amount of processing necessary for the search can be somewhat suppressed compared to the case of the base CRL 1400. In addition, because file size is also smaller, the amount of storage capacity necessary to store the CRL 600X can be somewhat suppressed compared to the case of the base CRL 1400.

Upon receiving the CRL 600X transmitted from the server 140, the controller 120 makes a search to determine whether a public key certificate ID of the public key certificate transmitted from the device 110X is described in the CRL 600X (step S1615).

If the public key certificate ID of the public key certificate transmitted from the device 110X is not described in the CRL 600X in the processing in step S1615 (step S1615: No), the controller 120 verifies a signature of the public key certificate transmitted from the device 110X (step S1620).

If the public key certificate ID of the public key certificate transmitted from the device 110X is described in the CRL 600X in the processing in step S1615 (step S1615: Yes) or if the verification of the public key certificate is not successful in the processing in step S1620 (step S1620: No), the controller 120 notifies the device 110X of the error and determines the device 110X as a revocation target. The controller 120 does not add information regarding the device 110X to the device information 300 stored in the device information storage unit 250 (step S1625).

If the verification of the public key certificate is successful in the processing in step S1620 (step S1620: Yes), the controller 120 generates random numbers and transmits the generated random numbers, a controller ID thereof, the public key certificate stored therein, and the CRL 600X to the device 110 (step S1630).

Upon receiving the random numbers, the controller ID, the public key certificate, and the CRL 600X transmitted from the controller 120, the device 110X makes a search to determine whether a public key certificate ID of the public key certificate transmitted from the controller 120 is described in the CRL 600X (step S1635).

If the public key certificate ID of the public key certificate transmitted from the controller 120 is not described in the CRL 600X in the processing in step S1635 (step S1635: No), the device 110X verifies a signature of the public key certificate transmitted from the controller 120 (step S1640).

If the public key certificate ID of the public key certificate transmitted from the controller 120 is described in the CRL 600X in the processing in step S1635 (step S1635: Yes) or if the verification of the public key certificate is not successful in the processing in step S1640 (step S1640: No), the device 110X notifies the controller 120 of the error and determines the controller 120 as a revocation target. The device 110X does not add information regarding the controller 120 to the controller information 1100 stored in the controller information storage unit 960 (step S1645).

If the verification of the public key certificate is successful in the processing in step S1640 (step S1640: Yes), the device 110X generates a signature from the random numbers transmitted from the controller 120 and the private key stored therein (step S1650).

The signature may be, for example, a signature based on an elliptic curve digital signature algorithm (ECDSA; refer to "Suite B Implementer's Guide to FIPS 186-3 (ECDSA)").

After generating the signature, the device 110X generates random numbers and transmits the generated signature and the generated random numbers to the controller 120 (step S1700 (refer to FIG. 17)).

Upon receiving the random numbers and the signature transmitted from the device 110X, the controller 120 verifies the signature transmitted from the device 110X (step S1710).

If the verification of the signature is not successful in the processing in step S1710 (step S1710: No), the controller 120 notifies the device 110X of the error and determines the device 110X as a revocation target. The controller 120 does not add the information regarding the device 110X to the device information 300 stored in the device information storage unit 250 (step S1720).

If the verification of the signature is successful in the processing in step S1710 (step S1710: Yes), the controller 120 generates a signature from the random numbers transmitted from the device 110X and the private key stored therein (step S1730) and transmits the generated signature to the device 110X (step S1740).

Upon receiving the signature transmitted from the controller 120, the device 110X verifies the signature transmitted form the controller 120 (step S1750).

If the verification of the signature is not successful in the processing in step S1750 (step S1750: No), the device 110X notifies the controller 120 of the error and determines the controller 120 as a revocation target. The device 110X does not add the information regarding the controller 120 to the controller information 1100 stored in the controller information storage unit 960 (step S1760).

If the verification of the signature is successful in the processing in step S1750 (step S1750: Yes), the device 110X notifies the controller 120 of the success and obtains necessary information from the controller 120. The device 110X adds the information regarding the controller 120 to the controller information 1100 stored in the controller information storage unit 960 to register the controller 120 (step S1770).

Upon being notified of the success from the device 110X, the controller 120 obtains necessary information from the device 110X and adds the information regarding the device 110X to the device information 300 stored in the device information storage unit 250 to register the device 110X. The controller 120 transmits the information obtained from the device 110X and the controller ID thereof to the server 140 (step S1780).

Upon receiving the information regarding the device 110X and the controller ID of the controller 120, the server 140 associates the device 110X and the controller 120 with each other and adds the information regarding the device 110X to the device information 1300 stored in the device information storage unit 1270 while associating the information with the controller ID of the controller 120 to register the device 110X (step S1790).

After the processing in step S1625 ends, the processing in step S1645 ends, the processing in step S1720 ends, the processing in step S1760 ends, or the processing in step S1790 ends, the authentication system 100 ends the process for registering a device.

Figure 18:
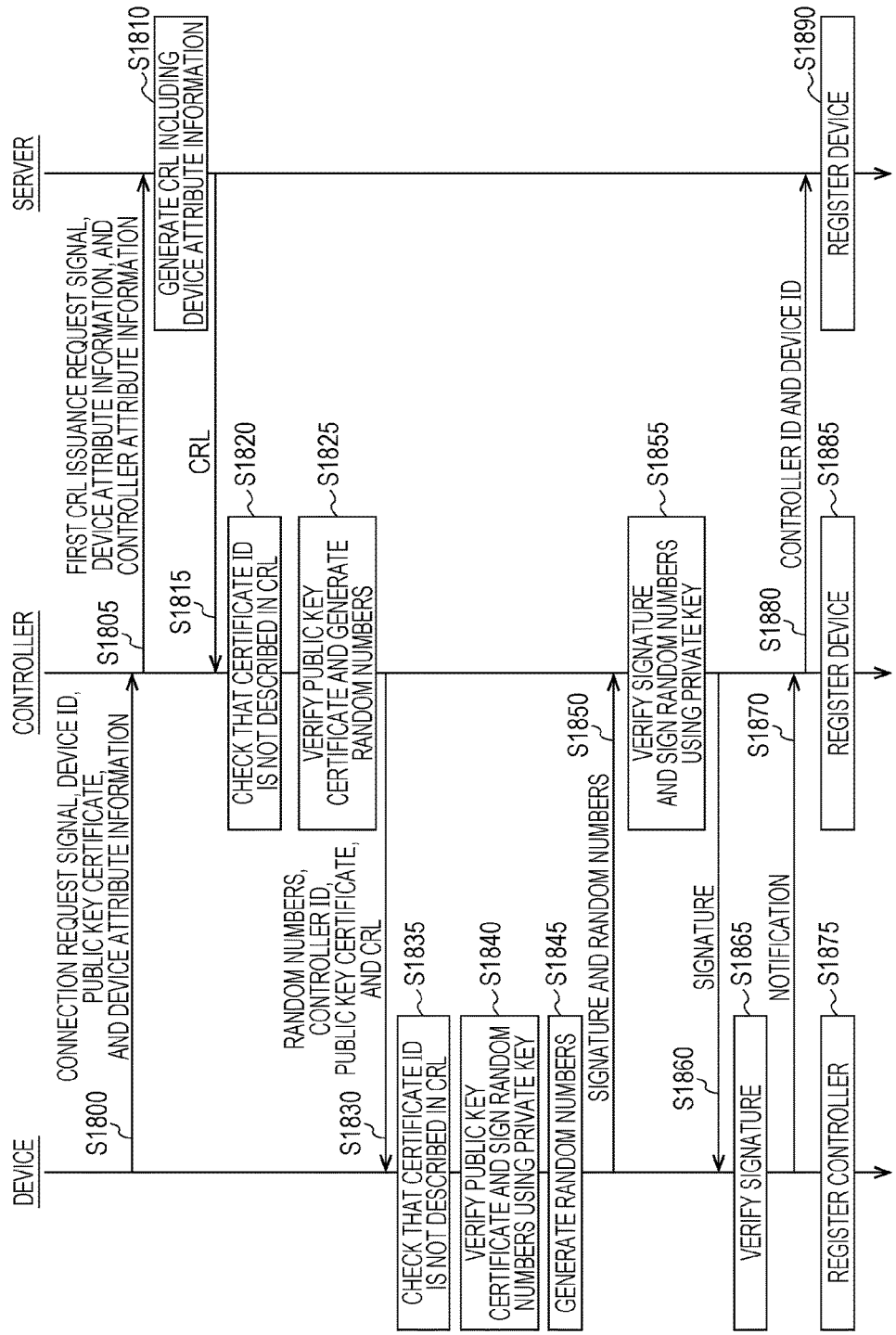
FIG. 18 is a sequence diagram of the process for registering a device.

FIG. 18 is a sequence diagram of a process performed by the device 110X, the controller 120, and the server 140.

The figure is a sequence diagram at a time when the processing in step S1615 is No, the processing in step S1620 is Yes, the processing in step S1635 is No, the processing in step S1640 is Yes, the processing in step S1710 is Yes, and the processing in step S1750 is Yes.

After the process for registering a device starts, the device 110X transmits the connection request signal, the device ID, the public key certificate, and the device attribute information to the controller 120 (step S1800: corresponds to step S1600).

The controller 120 then transmits the first CRL issuance request signal, the device attribute information, and the controller attribute information to the server 140 (step S1805: corresponds to step S1605).

The server 140 in turn generates the CRL 600X including device attribute information (step S1810: corresponds to step S1610) and transmits the generated CRL 600X to the controller 120 (step S1815: corresponds to step S1610).

The controller 120 then checks that the public key certificate ID of the public key certificate of the device 110X is not described in the CRL 600X (step S1820: corresponds to step S1615: No).

Next, the controller 120 verifies the public key certificate of the device 110X and generates the random numbers (step S1825: corresponds to step S1620: Yes and step S1630). The controller 120 then transmits the generated random numbers, the controller ID, the public key certificate thereof, and the CRL 600X to the device 110X (step S1830: corresponds to step S1630).

The device 110X in turn checks that the public key certificate ID of the public key certificate of the controller 120 is not described in the CRL 600X (step S1835: corresponds to step S1635: No).

Next, the device 110X verifies the public key certificate of the controller 120 and signs the random numbers using the private key (step S1840: corresponds to step S1640: Yes and step S1650).

The device 110X then generates the random numbers (step S1845: corresponds to step S1700) and transmits the signature and the random numbers to the controller 120 (step S1850: corresponds to step S1700).

The controller 120 in turn verifies the signature and signs the random numbers using the private key (step S1855: corresponds to step S1710: Yes and step S1730).

Next, the controller 120 transmits the signature to the device 110X (step S1860: corresponds to step S1740).

The device 110X then verifies the signature (step S1865: corresponds to step S1750) and notifies the controller 120 of the success (step S1870: corresponds to step S1770) to register the controller 120 (step S1875: corresponds to step S1770).

The controller 120 in turn transmits the controller ID and the device ID to the server 140 (step S1880: corresponds to step S1780) to register the device 110X (step S1885: corresponds to step S1780).

Finally, the server 140 registers the device 110X (step S1890: corresponds to step S1790).

Process for Updating Device CRL

The process for updating device CRLs is a process cooperatively performed by the devices 110, the controller 120, and the server 140 and a process for updating CRLs stored in the devices 110.

Figure 19:
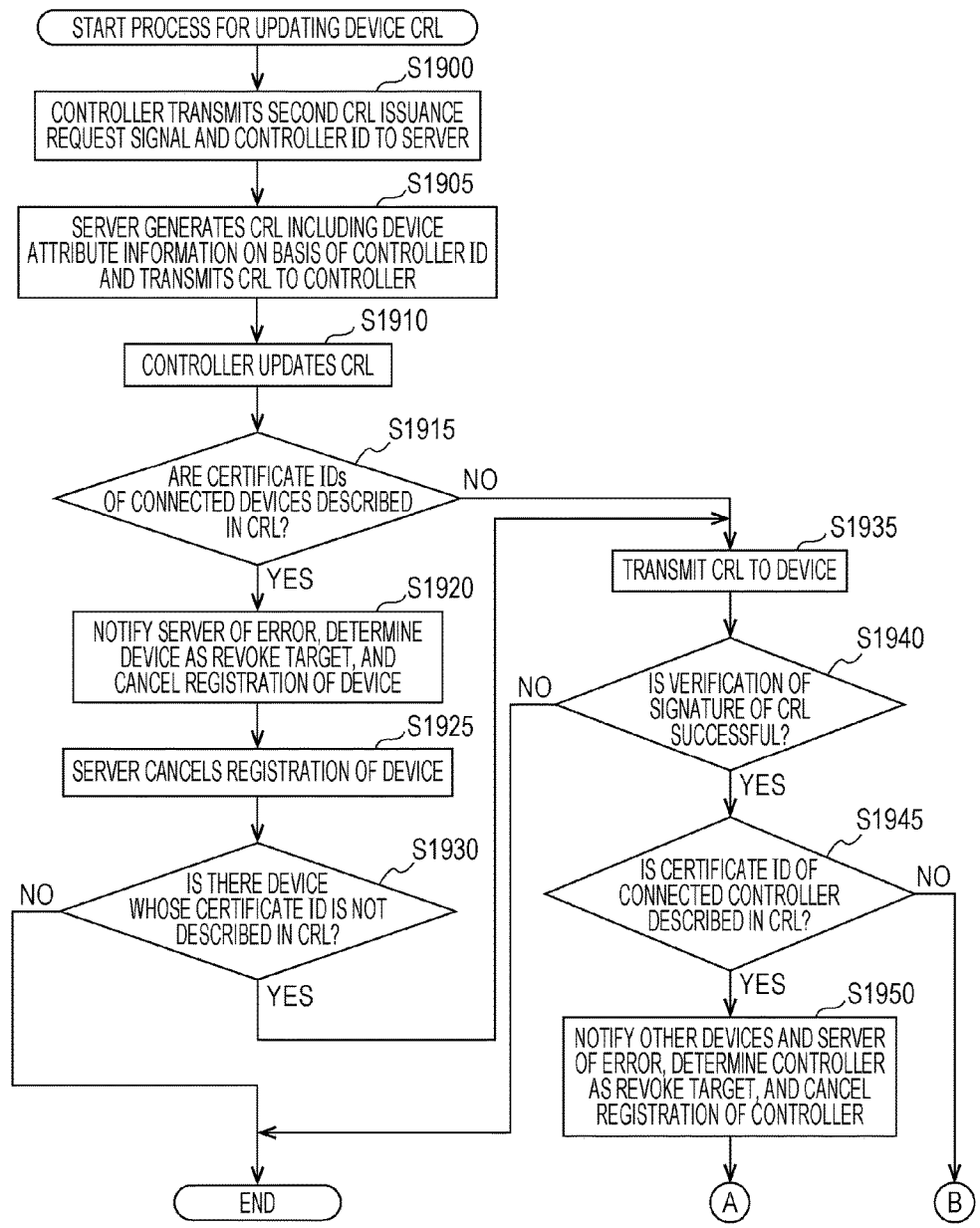
FIG. 19 is a first flowchart of a process for updating device CRLs.
Figure 20:
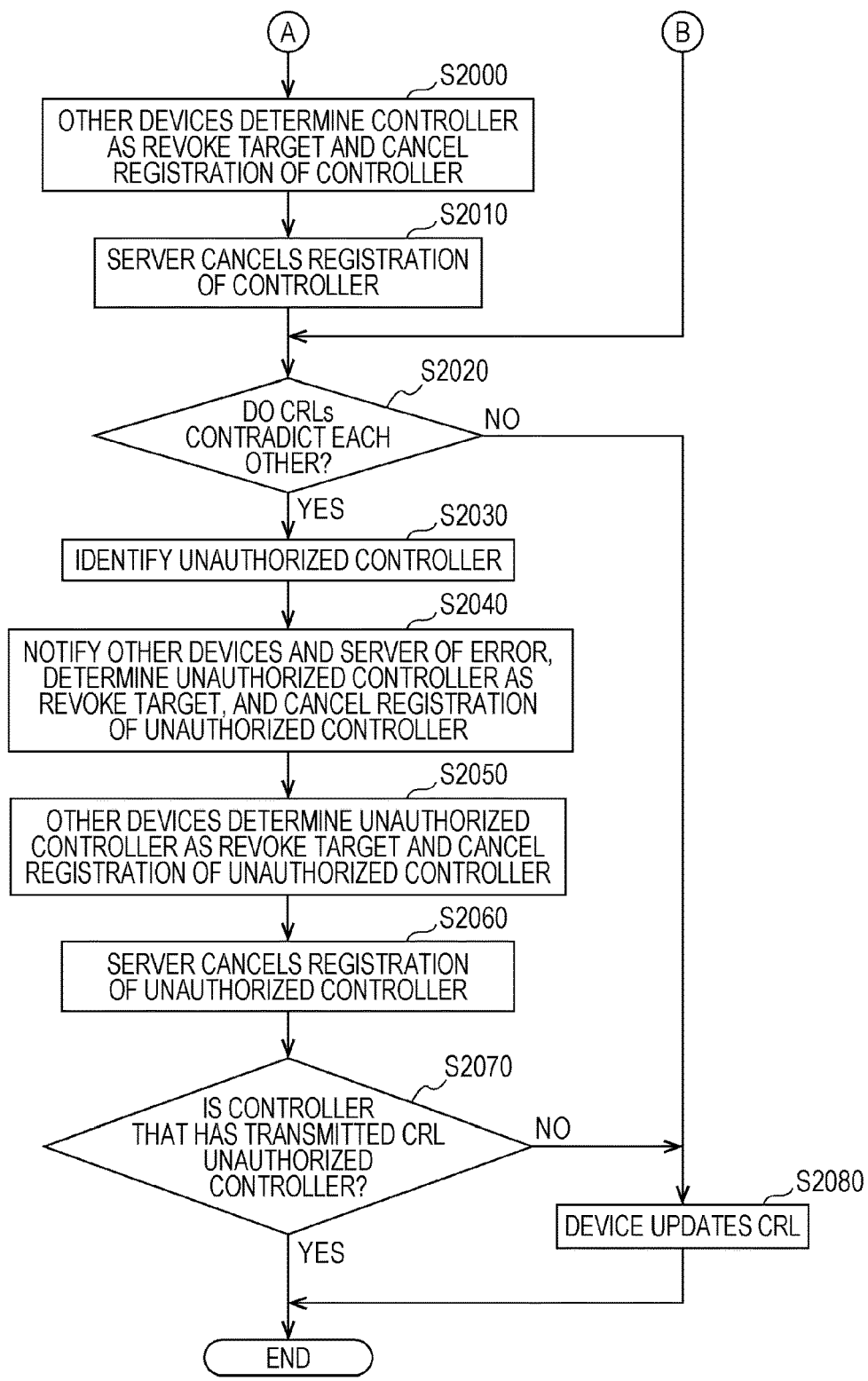
FIG. 20 is a second flowchart of the process for updating device CRLs.

FIGS. 19 and 20 are flowcharts of the process for updating device CRLs.

The process for updating device CRLs starts when a certain condition is satisfied (e.g., when the device information 300 stored in the controller 120 is updated by performing the process for registering a device, when a predetermined time has come (e.g., the next issue data described in the CRL, the first day of each month, or the like), when a certain operation has been performed on the controller 120 or a device 110, or the like).

After the process for updating device CRLs starts, the controller 120 transmits, to the server 140, a second CRL issuance request signal indicating that the controller 120 is requesting issuance of a new CRL and the controller ID thereof (step S1900).

The server 140 refers to the device information 1300 stored in the device information storage unit 1270 and generates a CRL 600 (the generated CRL 600 will be referred to as a "CRL 600Y" hereinafter) including only the controller type of controller 120 and the types of devices 110 connected to the HAN 130 to which the controller 120 is connected as the attribute information regarding the device on the basis of the controller ID transmitted from the controller 120. The server 140 then transmits the attribute information regarding the device to the controller 120 (step S1905).

Although the attribute information regarding the devices 110 is types, the attribute information regarding the controller 120 is a controller type, and the CRL stored in the devices 110 and the controller 120 is the CRL 600 here, the same holds when the attribute information regarding the devices 110 is countries, the attribute information regarding the controller 120 is a country, and the CRL stored in the device 110 and the controller 120 is the CRL 700 or when the attribute information regarding the devices 110 is companies, the attribute information regarding the controller 120 is a company, and the CRL stored in the device 110 and the controller 120 is the CRL 800.

The processing in step S1905 is realized, for example, by the following plurality of processes.

The server 140 (1) refers to the device information 1300 stored in the device information storage unit 1270 and identifies all the devices 110 connected to the HAN 130 to which the controller 120 is connected on the basis of the controller ID transmitted from the controller 120. Next, the server 140 (2) refers to the device information stored in the device information storage unit 1270 and identifies the controller type of controller 120 and types of devices 110. The server 140 then (3) refers to the CRL issuance information 1500 stored in the CRL storage unit 1250 and extracts revoked certificate IDs associated with the identified controller type and types. Furthermore, the server 140 (4) generates the CRL 600Y such that the CRL 600Y includes all the revoked certificate IDs and causes the encryption process unit 1240 to sign the generated CRL 600Y. Finally, the server 140 (5) transmits the signed CRL 600Y to the controller 120.

Since only the revoked certificate ID group associated with the controller type of controller 120 and the types of devices 110 connected to the HAN 130 to which the controller 120 is connected are described in the CRL 600Y, the number of revoked certificate IDs is smaller than in the base CRL 1400. When a revoked certificate ID is searched for, therefore, the amount of processing necessary for the search can be somewhat suppressed compared to when the base CRL 1400 is used. In addition, because the file size is also smaller, the amount of storage capacity necessary to store the CRL 600Y can be somewhat suppressed compared to the case of the base CRL 1400.

The controller 120 receives the CRL 600Y transmitted from the server 140 and updates the CRL stored in the authentication information storage unit 270 using the received CRL 600Y (step S1910).

After updating the CRL, the controller 120 refers to the device information 300 stored in the device information storage unit 250 and makes a search to determine whether any public key certificate ID described in the CRL 600Y exists among public key certificate IDs of the devices 110 connected to the HAN 130 to which the controller 120 is connected (step S1915).

Here, the CRL 600Y includes the attribute information indicating the types of devices. Since the controller 120 can use the attribute information regarding the devices for the search, the amount of processing relating to the search can be somewhat suppressed compared to when a CRL that does not include the attribute information regarding the devices is used.

This is because public key certificate IDs to be searched for can be limited to public key certificate IDs that match the attribute information regarding the applicable devices.

More specifically, if the type of target device is an air conditioner, a search is carried out while limiting search targets to, among the revoked certificate IDs included in the CRL 600Y, the revoked certificate ID group 680, which is classified into "type: air conditioner 670".

That is, by making a search while determining a part of the tree structure into which the target device is classified as the search targets of revoked certificate IDs, the amount of processing relating to the search is somewhat suppressed.

If any public key certificate ID described in the CRL 600Y exists among the public key certificate IDs of the devices 110 connected to the HAN 130 to which the controller 120 is connected in the processing in step S1915 (step S1915: Yes), the controller 120 notifies the server 140 of the error and determines a corresponding device 110 (hereinafter referred to as a "device 110Y") as a revocation target. The controller 120 removes information regarding the device 110Y from the device information 300 stored in the server 140 to cancel the registration of the device 110Y (step S1920).

Upon being notified of the error, the server 140 removes the information regarding the device 110Y from the device information 1300 stored in the device information storage unit 1270 to cancel the registration of the device 110Y (step S1925).

The controller 120 further refers to the device information 300 stored in the device information storage unit 250 and makes a search to determine whether any public key certificate ID that is not described in the CRL 600Y exists among the public key certificate IDs of the devices 110 connected to the HAN 130 to which the controller 120 is connected (step S1930).

Here, the CRL 600Y includes the attribute information indicating the types of devices. Since the controller 120 can use the attribute information regarding the devices for the search, the amount of processing relating to the search can be somewhat suppressed compared to when a CRL that does not include the attribute information regarding the devices is used.

If any public key certificate ID described in the CRL 600Y does not exists among the public key certificate IDs of the devices 110 connected to the HAN 130 to which the controller 120 is connected in the processing in step S1915 (step S1915: No) or if any public key certificate ID that is not described in the CRL 600Y exists among the public key certificate IDs of the devices 110 connected to the HAN 130 to which the controller 120 is connected in the processing in step S1930 (step S1930: Yes), the controller 120 transmits the CRL 600Y to the corresponding device 110 (step S1935).

The device 110 receives the CRL 600Y transmitted from the controller 120 and verifies the signature of the CRL 600Y (step S1940).

If the verification of the signature of the CRL 600Y is successful in the processing in step S1940 (step S1940: Yes), the device 110 makes a search to determine whether any public key certificate ID described in the CRL 600Y exists among controllers 120 connected to the HAN 130 to which the controller 120 is connected (step S1945).

Here, the CRL 600Y includes the attribute information indicating controller types of controllers. Since the device 110 can use the attribute information regarding the controllers for the search, the amount of processing relating to the search can be somewhat suppressed compared to when a CRL that does not include the attribute information regarding the controllers is used.

This is because public key certificate IDs to be searched for can be limited to public key certificate IDs that match the attribute information regarding the applicable controllers.

If any public key certificate ID described in the CRL 600Y exists among public key certificate IDs of the controllers 120 connected to the HAN 130 to which the controller 120 is connected in the processing in step S1945 (step S1945: Yes), the device 110 notifies all the other devices 110 connected to the HAN 130 to which the device 110 is connected and the server 140 of the error and determines the corresponding controller 120 as a revocation target. The device 110 removes information regarding the corresponding controller 120 from the controller information 1100 stored in the controller information storage unit 960 to cancel the registration of the corresponding controller 120 (step S1950).

As methods for transmitting information to all devices connected to a HAN 130, there are methods, for example, generally called broadcast and multicast, a method described in Jeffrey Mogul, RFC919, "BROADCASTING INTERNET DATAGRAMS", [online], October 1984, Internet Engineering Task Force, [Retrieved on Nov. 17, 2014], Internet <URL: http://www.rfc-editor.org/rfc/pdfrfc/rfc919.txt.pdf> and the like.

The notification to the server 140 is desirably performed using a method in which the corresponding controller 120 is not used (e.g., a method in which another controller 120 capable of communicating with the device 110 is used if such a controller 120 exists, a method in which the device 110 directly communicates with the server 140 if the device 110 also has a function of directly communicating with the server 140, or the like), if such a method exists.

The other devices 110 determine the corresponding controller 120 as a revocation target and removes the information regarding the corresponding controller 120 from the controller information 1100 stored in their respective controller information storage units 960 to cancel the registration of the corresponding controller 120 (step S2000 (refer to FIG. 20)).

The server 140 removes the information regarding the corresponding controller 120 from the device information 1300 stored in the device information storage unit 1270 (step S2010).

If any public key certificate ID described in the CRL 600Y does not exist among the public key certificate IDs of the controllers 120 connected to the HAN 130 to which the controller 120 is connected in the processing in step S1945 (step S1945: No) or after the processing in step S2010 ends, the device 110 compares the CRL 600Y with the CRL 600 (hereinafter referred to as a "CRL 600Z") stored in the authentication information storage unit 970 and checks whether the CRL 600Y and the CRL 600Z contradict each other (step S2020). If the CRL 600Y and the CRL 600Z contradict each other (step S2020: Yes), the device 110 identifies an unauthorized controller (step S2030).

An example of the verification whether the CRL 600Y and the CRL 600Z contradict each other will be described hereinafter. The example described hereinafter is an example of a case in which a controller 120 that has transmitted the CRL 600Y and a controller 120 that has transmitted the CRL 600Z are different from each other.

Verification Example 1

The device 110 compares an issue date of the CRL 600Y with a next issue date of the CRL 600Z. If the next issue date of the CRL 600Z is earlier than the issue date of the CRL 600Y, the device 110 determines that the next issue date of the CRL 600Z has already come and that the CRLs contradict each other. The device 110 then identifies the controller 120 that has transmitted the CRL 600Z to the device 110 as an unauthorized controller because the controller 120 has not updated the CRL 600.

Verification Example 2

The device 110 compares a CRL version of the CRL 600Y with a CRL version of the CRL 600Z. If the CRL versions of the two do not match, the device 110 determines that the CRLs contradict each other. The device 110 then identifies the controller 120 that has transmitted a CRL 600 whose CRL version is older as an unauthorized controller because the controller 120 has not updated the CRL 600.

After identifying an unauthorized controller, the device 110 notifies all the other devices 110 connected to the HAN 130 to which the device 110 is connected and the server 140 of the error and determines the unauthorized controller as a revocation target. The device 110 removes information regarding the unauthorized controller from the controller information 1100 stored in the controller information storage unit 960 to cancel the registration of the unauthorized controller (step S2040).

The other devices 110 determine the unauthorized controller as a revocation target and remove the information regarding the unauthorized controller from the controller information 1100 stored in their respective controller information storage units 960 to cancel the registration of the unauthorized controller (step S2050).

The server 140 removes the information regarding the unauthorized controller from the device information 1300 stored in the device information storage unit 1270 (step S2060).

The device 110 checks whether the controller 120 that has transmitted the CRL 600Y is an unauthorized controller (step S2070).

If the CRL 600Y and the CRL 600Z do not contradict each other in the processing in step S2020 (step S2020: No) or if the controller 120 that has transmitted the CRL 600Y is not an unauthorized controller in the processing in step S2070 (step S2070: No), the device 110 updates the CRL stored in the authentication information storage unit 970 (step S2080).

After the processing in step S2080 ends or if the controller 120 that has transmitted the CRL 600Y is an unauthorized controller in the processing in step S2070 (step S2070: Yes), the authentication system 100 ends the process for updating device CRLs.

Figure 21:
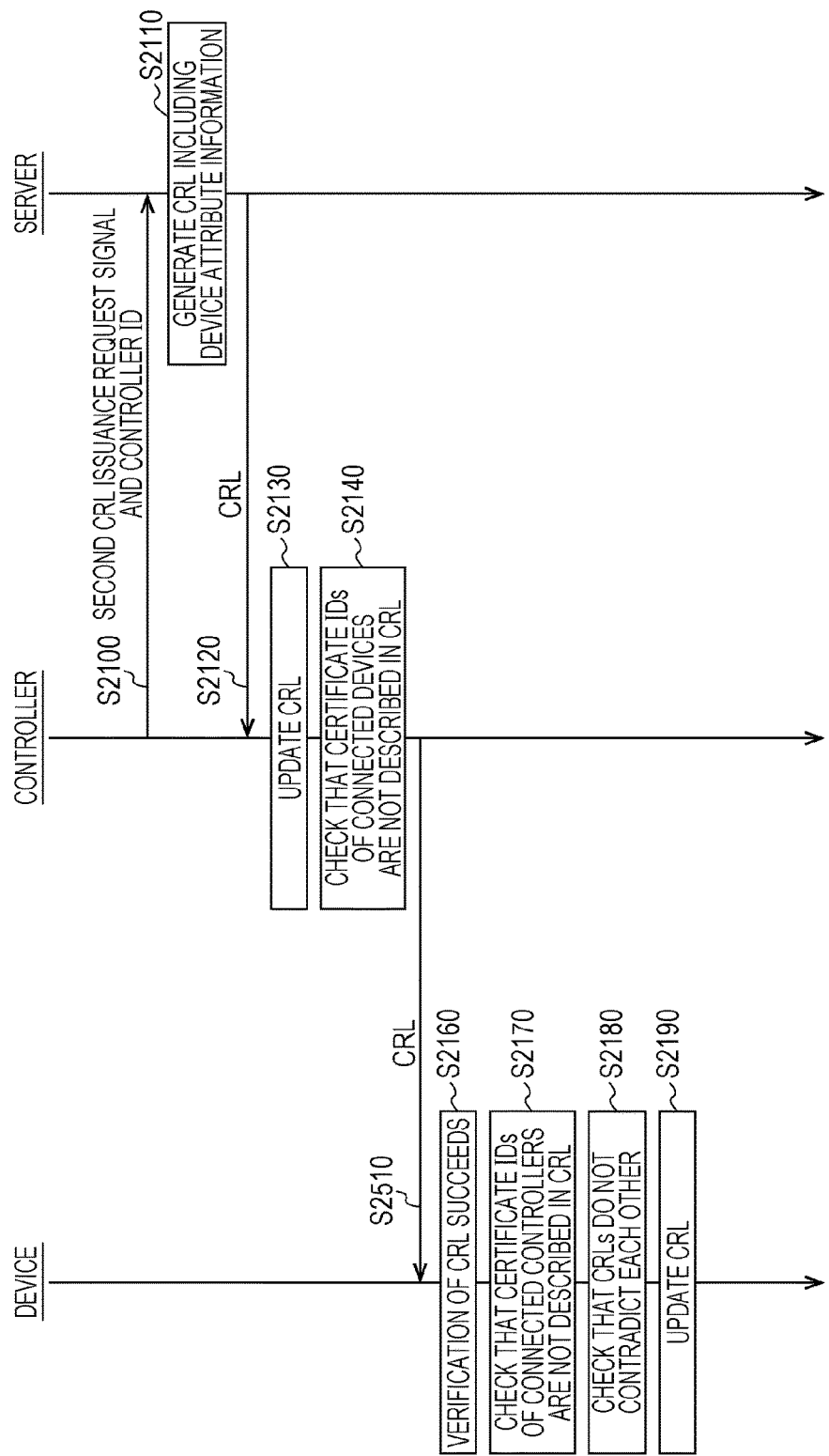
FIG. 21 is a sequence diagram of the process for updating device CRLs.

FIG. 21 is a sequence diagram of a process performed by the device 110, the controller 120 and the server 140 in the process for updating device CRLs.

The figure is a sequence diagram at a time when the processing in step S1915 is No, the processing in step S1940 is Yes, the processing in step S1945 is No, and the processing in step S2020 is No.

After the process for updating device CRLs starts, the controller 120 transmits the second CRL issuance request signal and the controller ID to the server 140 (step S2100: corresponds to step S1900).

The server 140 in turn refers to the device information 1300 and generates the CRL 600Y including the attribute information regarding the devices connected to the HAN 130 to which the controller 120 is connected on the basis of the controller ID (step S2110: corresponds to step S1905). The server 140 transmits the generated CRL 600Y to the controller 120 (step S2120: corresponds to step S1905).

The controller 120 then updates the CRL stored in the authentication information storage unit 270 using the received CRL 600Y (step S2130: corresponds to step S1910).

Next, the controller 120 checks that any public key certificate ID described in the CRL 600Y does not exist among the public key certificate IDs of the devices 110 connected to the HAN 130 to which the controller 120 is connected (step S2140: corresponds to step S1915: No) and transmits the CRL 600Y to the device 110 (step S2150: corresponds to step S1935).

The device 110 in turn verifies the signature of the received CRL 600Y and succeeds (step S2160: corresponds to step S1940: Yes). The device 110 checks that any public key certificate ID described in the CRL 600Y does not exist among the public key certificate IDs of the controllers 120 connected to the HAN 130 to which the device 110 is connected (step S2170: corresponds to step S1945: No).

The device 110 then checks that the CRLs do not contradict each other (step S2180: corresponds to step S2020: No) and updates the CRL stored in the authentication information storage unit 970 using the CRL 600Y (step S2190: corresponds to step S2080).

Examination

In the authentication system 100 having the above configuration, a CRL (e.g., the CRL 600, the CRL 700, or the CRL 800) issued from the server 140 includes attribute information regarding devices (devices 110 and controllers 120) connected to a HAN 130.

Since a controller 120 can use the attribute information regarding the devices included in the CRL for the search to determine whether a public key certificate ID of a device 110 is included in the CRL, inapplicable public key certificate IDs can be excluded from search targets by limiting public key certificate IDs that are the search targets to public key certificate IDs that match the attribute information regarding the device. As a result, the amount of processing relating to the search can be somewhat suppressed compared to when the search is carried out using a CRL that does not include the attribute information regarding the devices.

Similarly, since a device 110 can use the attribute information regarding the controllers included in the CRL for the search to determine whether a public key certificate ID of a controller 120 is included in the CRL, inapplicable public key certificate IDs can be excluded from search targets by limiting public key certificate IDs that are the search targets to public key certificate IDs that match the attribute information regarding the controller. As a result, the amount of processing relating to the search can be somewhat suppressed compared to when the search is carried out using a CRL that does not include the attribute information regarding the controllers.

Furthermore, the CRL (e.g., the CRL 600, the CRL 700, or the CRL 800) issued from the server 140 is described only for revoked certificate IDs among public key certificate IDs that match the attribute information regarding the devices (the devices 110 and the controllers 120) connected to the HAN 130, the file size is smaller than that of a CRL including all revoked certificate IDs. As a result, the amount of storage capacity necessary to store the CRL can be somewhat suppressed in the devices 110 and the controllers 120.

Second Embodiment

Outline

An authentication system 2200, which is obtained by modifying part of the authentication system 100 according to the first embodiment, will be described hereinafter as an aspect of the authentication method according to the present disclosure.

The authentication system 2200 is an example of a configuration that, when a user who uses the authentication system 2200 has purchased a new device, provides the device for the user with a CRL for the user stored in the device.

Differences between the authentication system 2200 and the authentication system 100 according to the embodiment will be mainly described hereinafter with reference to the drawings.

Configuration

Figure 22:
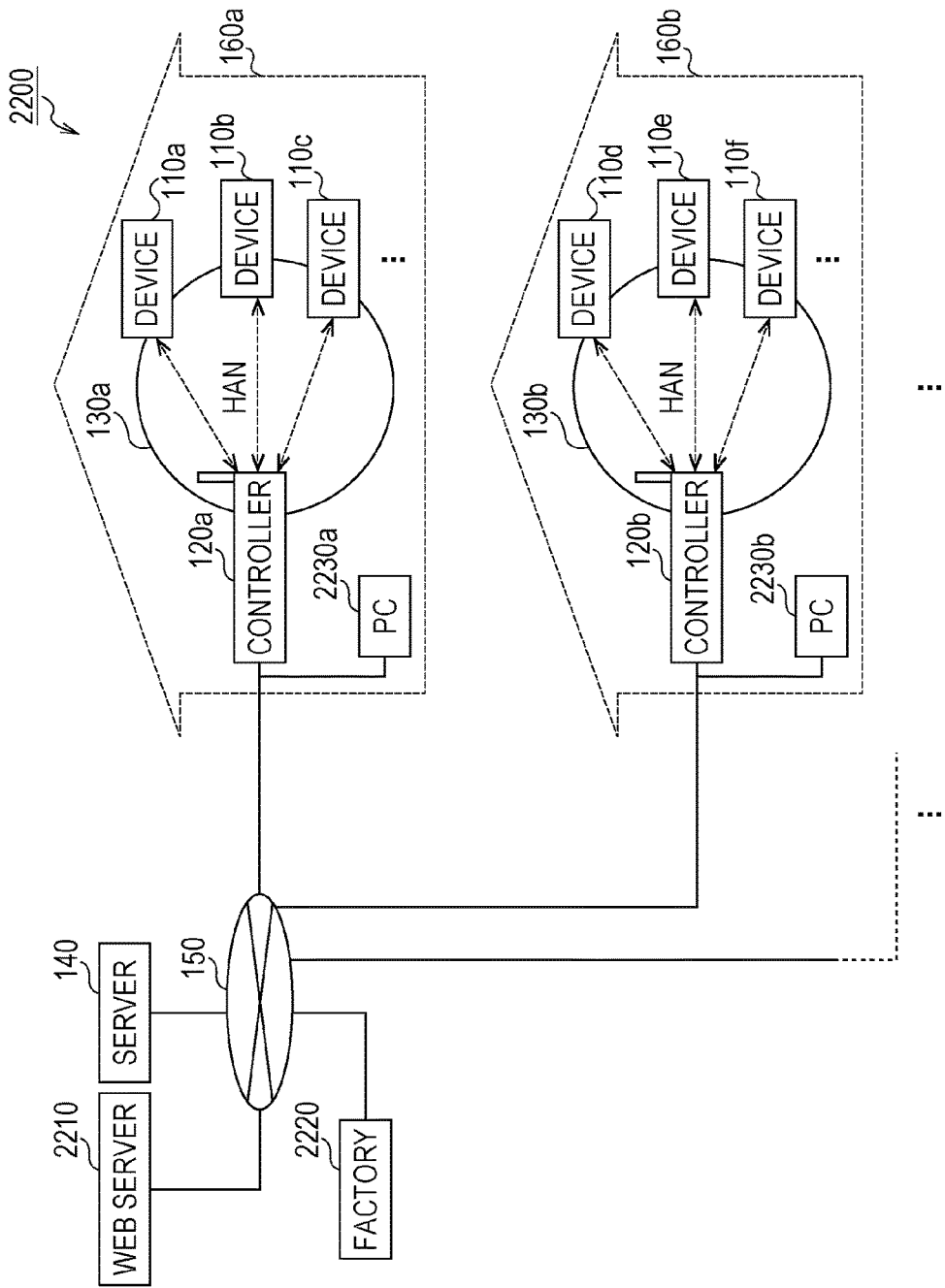
FIG. 22 is a system configuration diagram illustrating the configuration of an authentication system.

FIG. 22 is a system configuration diagram illustrating the configuration of the authentication system 2200.

The authentication system 2200 is obtained by modifying the authentication system 100 according to the first embodiment such that a web server 2210, a factory 2220, and PCs 2230a and 2230b are added.

The PCs 2230a and 2230b are so-called personal computers arranged in the households. The PCs 2230a and 2230b are connected to the network 150 and have a function of communicating with the web server 2210 through the network 150.

Although the PCs 2230a and 2230b are so-called personal computers here, the PCs 2230a and 2230b may be so-called mobile terminals such as smartphones.

The PCs 2230a and 2230b will be simply referred to as PCs 2230 unless the PCs 2230a and 2230b need to be explicitly distinguished from each other.

The factory 2220 is a manufacturing factory for manufacturing the devices 110 and connected to the network 150. The factory 2220 communicates with the web server 2210 through the network 150.

When a device 110 is manufactured, the factory 2220 can store a CRL transmitted from the web server 2210 in the authentication information storage unit 970 of the device 110.

Figure 23:
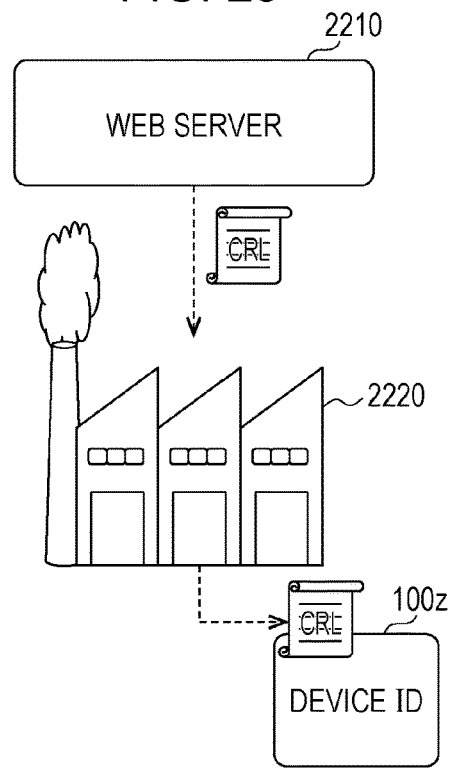
FIG. 23 is a schematic diagram illustrating an operation in which a factory stores a CRL transmitted from a web server in the device.

FIG. 23 is a schematic diagram illustrating an operation in which the factory 2220 stores the CRL transmitted from the web server 2210 in the device 110.

Returning to FIG. 22, the authentication system 2200 will be described.

The web server 2210 is a computer system connected to the network 150 and has (1) a site management function of managing a device purchase site used by a user who purchases a device 110, (2) a device information management function of obtaining and managing information regarding the device 110 to be purchased input by the user who uses the device purchase site, (3) a CRL issuance request function of requesting the server 140 to issue a CRL, and (4) a CRL transmission function of transmitting the CRL issued from the server 140 to the factory 2220 as a CRL to be stored in the device 110 to be manufactured.

Figure 24:
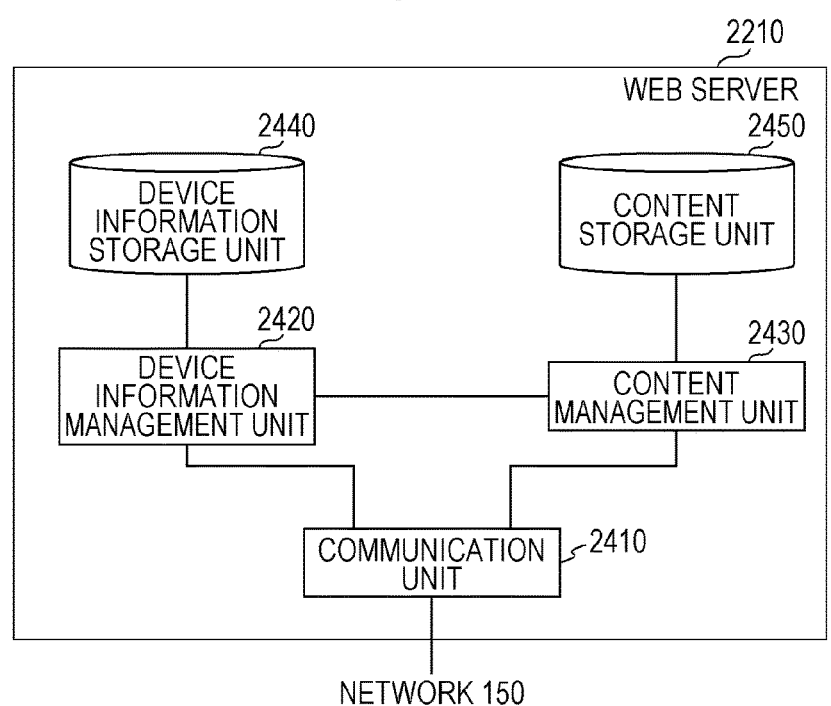
FIG. 24 is a block diagram illustrating the functional configuration of the web server.

FIG. 24 is a block diagram illustrating the functional configuration of the web server 2210.

As illustrated in the figure, the web server 2210 includes a communication unit 2410, a device information management unit 2420, a content management unit 2430, a device information storage unit 2440, and a content storage unit 2450.

The communication unit 2410 is realized by a processor that executes a program, a communication LSI circuit having a communication function, and a memory, for example, and connected to the device information management unit 2420, the content management unit 2430, and the network 150. The communication unit 2410 has a function of communicating with the devices connected to the network 150.

The communication unit 2410 performs SSL communication when communicating with the server 140 or the PCs 2230. A certificate and the like necessary for the SSL communication are stored in the communication unit 2410.

The content storage unit 2450 is realized by a memory, for example, and connected to the content management unit 2430. The content storage unit 2450 has a function of storing content of a website.

FIG. 25 is an example of a web screen configured by content stored in the content storage unit 2450 and displayed by a PC 2230 that accesses the device purchase site managed by the web server 2210.

The user who uses the device purchase site accesses the device purchase site by operating the PC 2230. The user selects a type of device owned by the user from among types displayed on the web screen to transmit information regarding the type of device owned by the user to the web server 2210.

Although the type is selected when the device 110 is purchased here, the selection need not be performed during the purchase, but may be performed before or after the purchase. In addition, although a selection target is information regarding the type of device owned by the user here, the selection target need not necessarily be limited to the type, but may be information regarding a producing country or a manufacturer. In addition, the type, the country, and the company may be combined with one another.

Returning to FIG. 24, the web server 2210 will be described.

The device information storage unit 2440 is realized by a memory, for example, and connected to the device information management unit 2420. The device information storage unit 2440 has a function of storing a device management table.

FIG. 26 is a data configuration diagram of a device management table 2600, which is an example of the device management table stored in the device information storage unit 2440.

As illustrated in the figure, the device management table 2600 is configured by associating user IDs 2610, device Nos. 2620, types 2630, countries 2640, and companies 2650 with one another.

The user IDs 2610 are identifiers identifying users who use the device management site. Although an example of a case in which the user IDs 2610 are e-mail addresses will be described here, the user IDs 2610 may be any alphanumeric character strings set by the users, for example, insofar as the users can be identified.

The device Nos. 2620 are information identifying devices 110 owned by the users identified by the user IDs 2610 associated therewith.

The types 2630 are one of pieces of attribute information indicating attributes of the devices identified by the device Nos. 2620 associated therewith and information indicating types. The types 2630 are, for example, an air conditioner, a television, a washing machine, and the like.

The countries 2640 are one of the pieces of attribute information indicating the attributes of the devices 110 identified by the device Nos. 2620 associated therewith and information indicating producing countries. The countries 2640 are, for example, country names, codes identifying countries, or the like.

The companies 2650 are one of the pieces of attribute information indicating the attributes of the devices 110 identified by the device Nos. 2620 associated therewith and information indicating manufacturers. The companies 2650 are, for example, company names, codes identifying companies, or the like.

Returning to FIG. 24, the configuration of the web server 2210 will be described.

The content management unit 2430 is realized by a processor that executes a program and a memory, for example, and connected to the communication unit 2410, the device information management unit 2420, and the content storage unit 2450. The content management unit 2430 has a function of managing content stored in the content storage unit 2450 and a function of obtaining user information transmitted from a PC 2230 used by a user who accesses the device purchase site.

The device information management unit 2420 is realized by a processor that executes a program and a memory, for example, and connected to the communication unit 2410, the content management unit 2430, and the device information storage unit 2440. The device information management unit 2420 has a function of updating and managing the device management table 2600 stored in the device information storage unit 2440 on the basis of the user information obtained by the content management unit 2430, a function of requesting the server 140 to issue a new CRL when the user who accesses the device purchase site using the PC 2230 has performed a process for purchasing the device 110, and a function of, when the CRL is issued from the server, controlling the communication unit 2410 and causing the factory 2220 to transmit the CRL as a CRL to be stored in the device 110 to be manufactured.

Operations performed by the authentication system 2200 configured as above will be described hereinafter with reference to the drawings.

Operations

The authentication system 2200 performs a process for purchasing a device and a process for updating CRLs at the purchase of a device as characteristic operations in addition to the process for updating device CRLs according to the first embodiment.

These processes will be sequentially described hereinafter.

Process for Purchasing Device

The process for purchasing a device is a process cooperatively performed by a PC 2230, the web server 2210, the server 140, and the factory 2220 and a process for storing a CRL for a user who purchases a device 110 in the device 110 when the user purchases the device 110.

Figure 27:
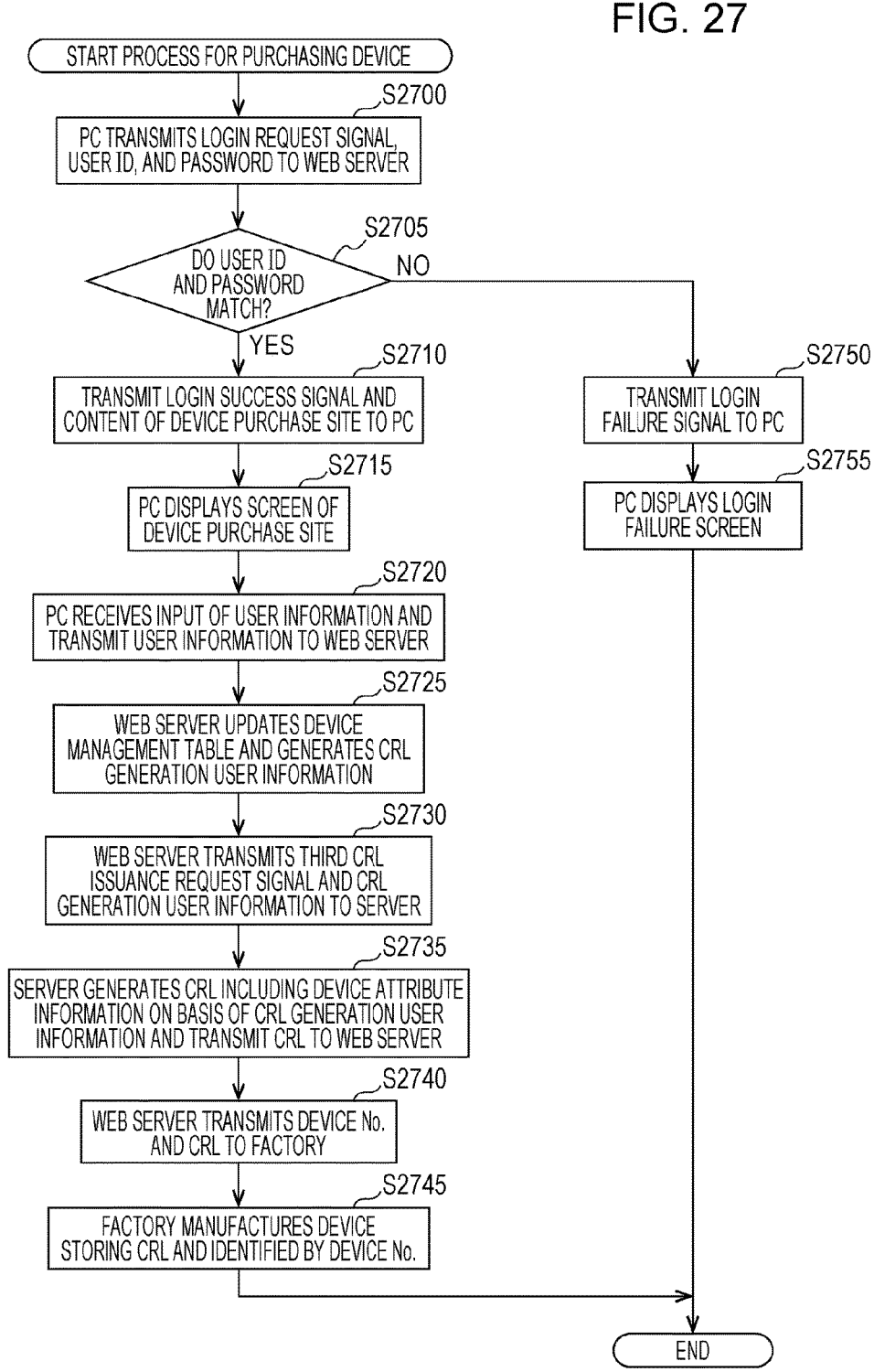
FIG. 27 is a flowchart of a process for purchasing a device.

FIG. 27 is a flowchart illustrating the process for purchasing a device.

The process for purchasing a device starts when a PC 2230 operated by the user who purchases the device 110 accesses the web server 2210.

After the process for purchasing a device starts, the PC 2230 transmits a login request signal for requesting login, a user ID, and a password to the web server 2210 in accordance with an operation performed by the user (step S2700).

Upon receiving the login request signal, the user ID, and the password, the web server 2210 checks whether a combination of the received user ID and password matches any combination of a user ID and a password already registered therein (step S2705).

If the combination of the user ID and the password matches in the processing in step S2705 (step S2705: Yes), the web server 2210 transmits a login success signal indicating that the login has been successfully achieved and the content of the device purchase site to the PC 2230 (step S2710).

Upon receiving the login success signal and the content of the device purchase site, the PC 2230 displays a screen of the device purchase site (step S2715).

As a result of an operation performed by the user who is viewing the screen of the device purchase site, the PC 2230 receives user information regarding types of devices owned by the user and transmits the user information to the web server 2210 (step S2720).

Upon receiving the user information, the web server 2210 updates the device management table 2600 stored in the device information storage unit 2440 on the basis of the received user information. The web server 2210 then refers to the updated device management table 2600 and generates CRL generation user information consisting of types 2630 associated with a corresponding user ID 2610 identifying the user (step S2725).

Although a case in which the CRL generation user information consists of the types 2630 associated with the corresponding user ID 2610 identifying the user will be described here, the same holds when the CRL generation user information consists of countries 2640 associated with the corresponding user ID 2610 identifying the user or when the CRL generation user information consists of companies 2650 associated with the corresponding user ID 2610 identifying the user.

After generating the CRL generation user information, the web server 2210 transmits, to the server 140, a third CRL issuance request signal indicating that the web server 2210 is requesting issuance of a new CRL and the generated CRL generation user information (step S2730).

Upon receiving the third CRL issuance request signal and the CRL generation user information, the server 140 generates a new CRL 600 including only the types included in the CRL generation user information as attribute information on the basis of the received CRL generation user information and transmits the generated CRL 600 to the web server 2210 (step S2735).

Upon receiving the CRL 600, the web server 2210 transmits a device No. identifying the device 110 purchased by the user and the received CRL 600 to the factory 2220 (step S2740).

Upon receiving the device No. and the CRL 600, the factory 2220 stores the received CRL 600 in the authentication information storage unit 970 of the device 110 identified by the received device No. and manufactures the device 110 (step S2745).

If the combination of the user ID and the password does not match in the processing in step S2705 (step S2705: No), the web server 2210 transmits a login failure signal indicating that the login has failed to the PC 2230 (step S2750).

Upon receiving the login failure signal, the PC 2230 displays a login failure screen indicating that the login has failed (step S2755).

After the processing in step S2755 ends or the processing in step S2745 ends, the authentication system 2200 ends the process for purchasing a device.

Figure 28:
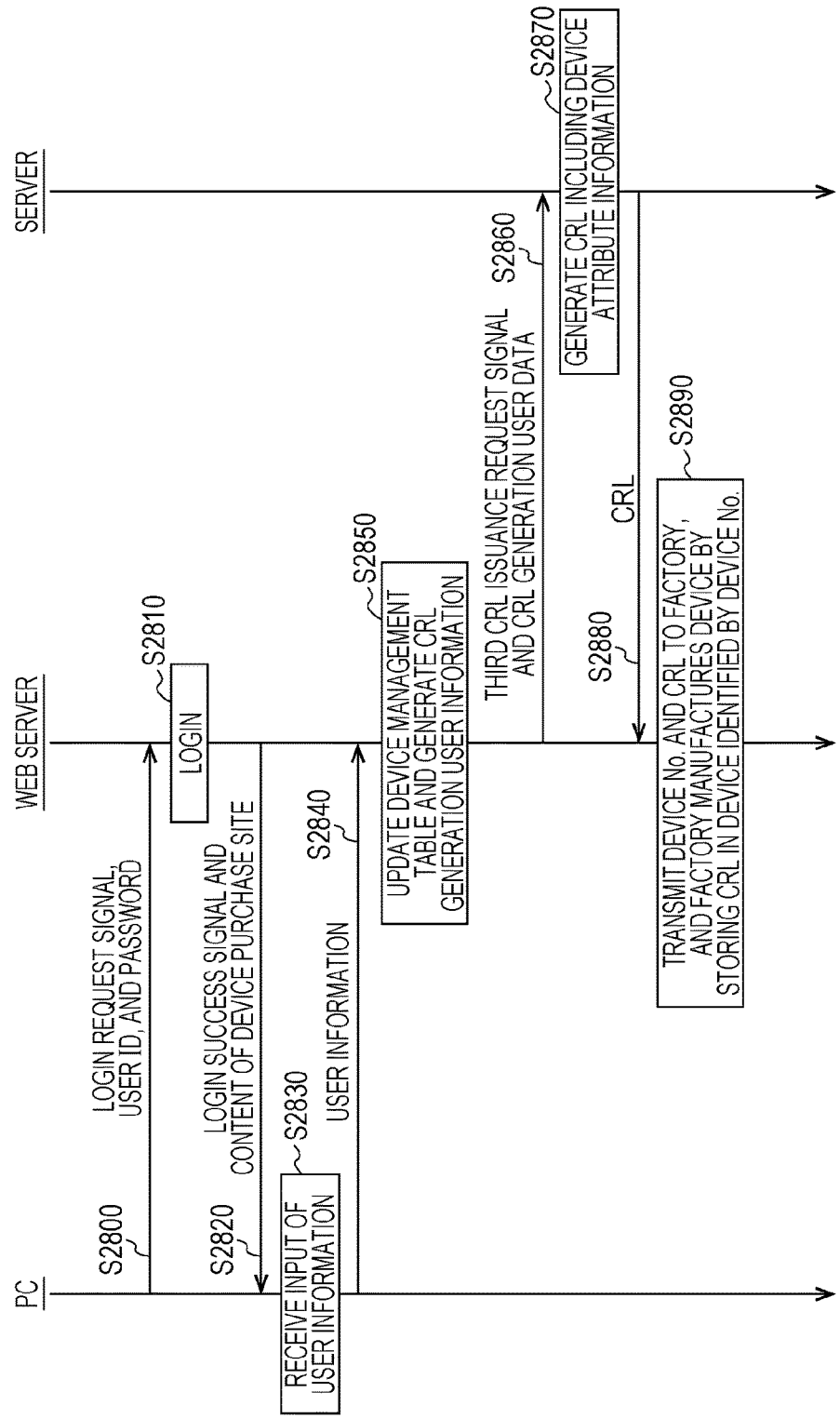
FIG. 28 is a sequence diagram of a process for purchasing a device.

FIG. 28 is a sequence diagram of a process performed by the PC 2230, the web server 2210, and the server 140 in the process for purchasing a device.

The figure is a sequence diagram at a time when the processing in step S2705 is Yes.

After the process for purchasing a device starts, the PC 2230 transmits the login request signal, the user ID, and the password to the web server 2210 (step S2800: corresponds to step S2700).

The web server 2210 then checks that the combination of the transmitted user ID and password matches a combination of a user ID and a password already registered therein (step S2810: corresponds to step S2705: Yes) and transmits the login success signal and the content of the device purchase site to the PC 2230 (step S2820: corresponds to step S2710).

The PC 2230 in turn displays the screen of the device purchase site and receives input user information as a result of the operation performed by the user (step S2830: corresponds to step S2715 and step S2720).

Next, the PC 2230 transmits the user information to the web server 2210 (step S2840: corresponds to step S2720).

The web server 2210 in turn updates the device management table 2600 on the basis of the received user information and generates the CRL generation user information (step S2850: corresponds to step S2725).

The web server 2210 then transmits the third CRL issuance request signal and the generated CRL generation user information to the server 140 (step S2860: corresponds to step S2730).

The server 140 in turn generates the CRL 600 including the attribute information regarding the device on the basis of the CRL generation user information (step S2870: corresponds to step S2735) and transmits the CRL 600 to the web server 2210 (step S2880: corresponds to step S2735).

Next, the web server 2210 transmits the device No. and the received CRL 600 to the factory 2220. The factory 2220 stores the received CRL 600 in the device 110 identified by the device No. and manufactures the device 110 (step S2890: corresponds to step S2740 and step S2745).

Process for Updating CRLs at Purchase of Device

The process for updating CRLs at the purchase of a device is a process cooperatively performed by the devices 110, the controllers 120, and the server 140 and a process for updating the CRLs 600 stored in devices 110 (hereinafter referred to as "existing devices 110") already connected to a HAN 130 and the CRLs 600 stored in the controllers 120 when a device 110 (hereinafter referred to as a "new device 110") newly purchased by the user who uses the authentication system 2200 is connected to the HAN 130.

Figure 29:
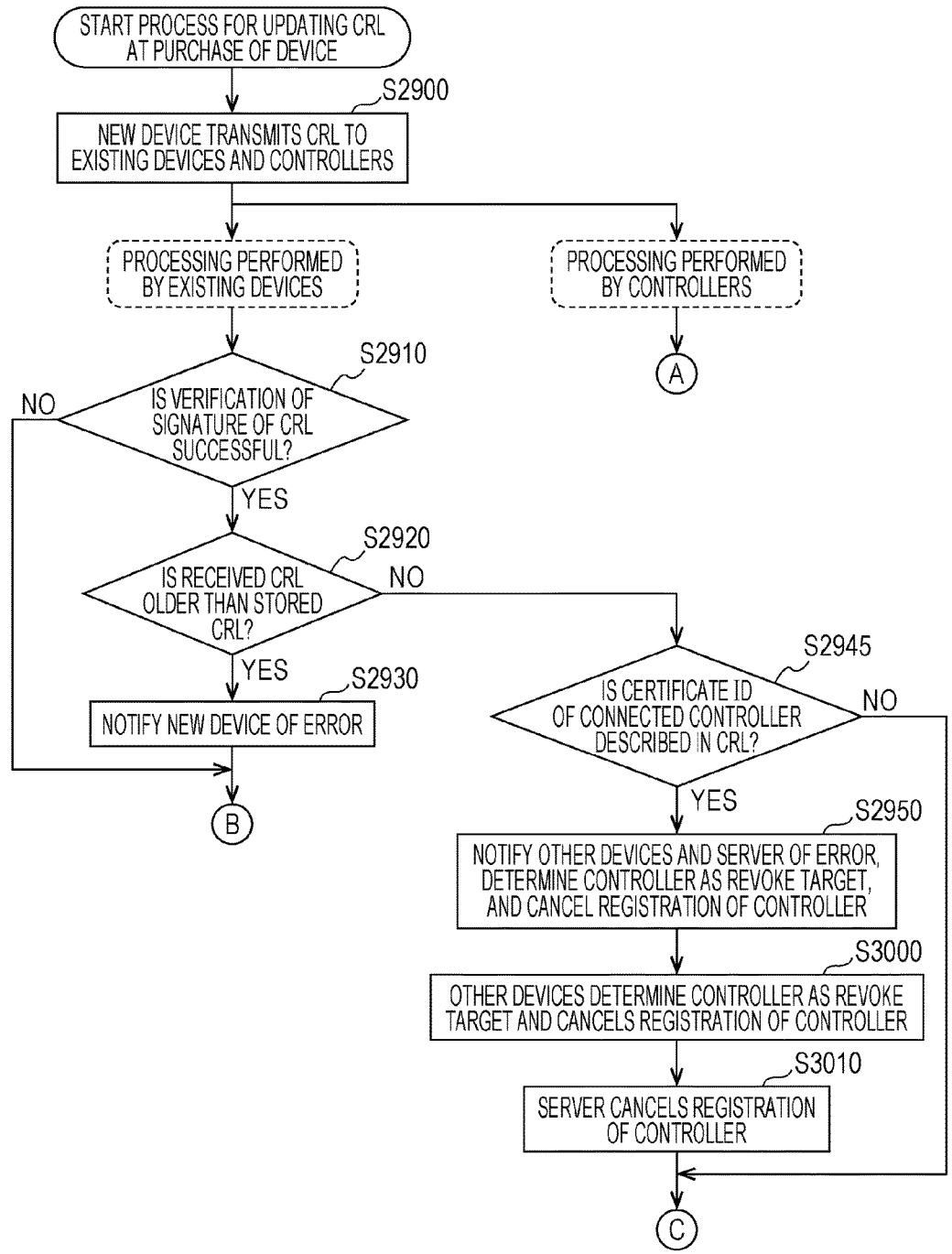
FIG. 29 is a first flowchart of a process for updating CRLs at the purchase of a device.
Figure 30:
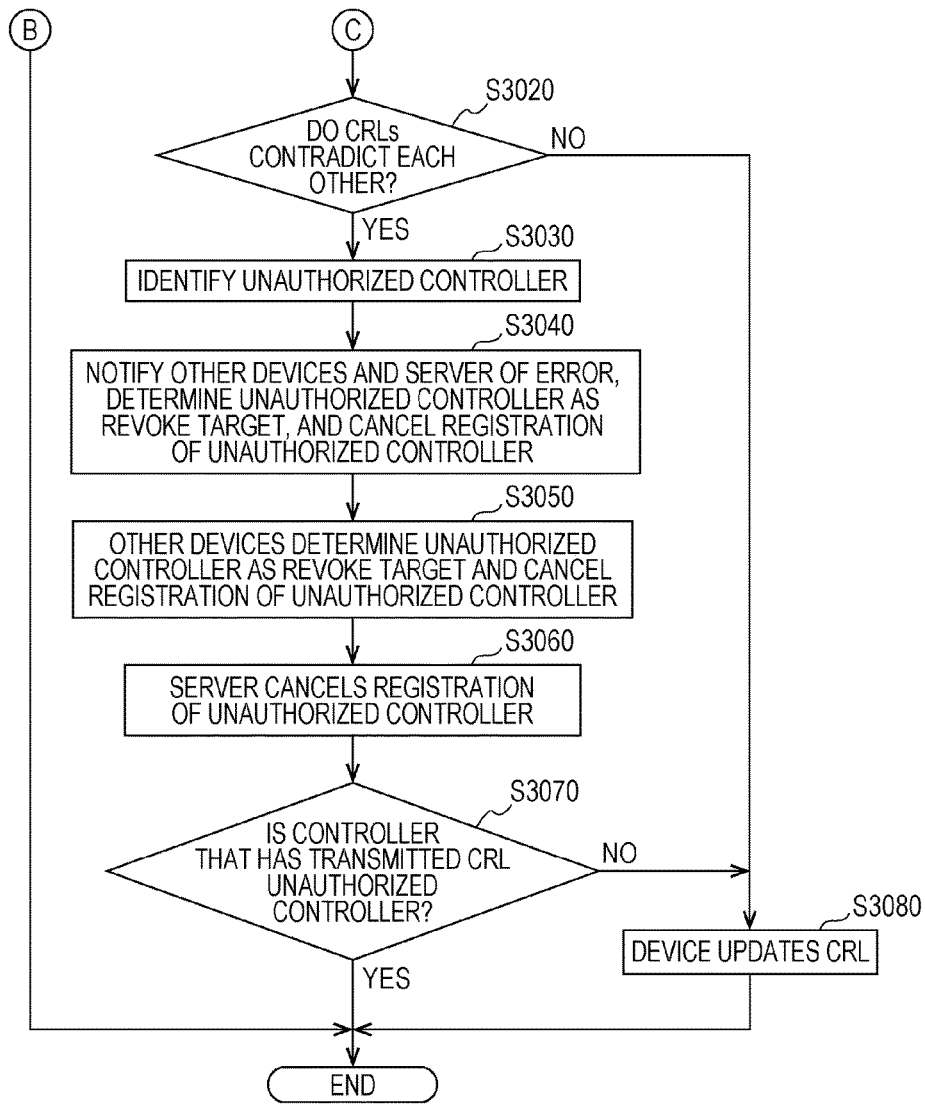
FIG. 30 is a second flowchart of the process for updating CRLs at the purchase of a device.
Figure 31:
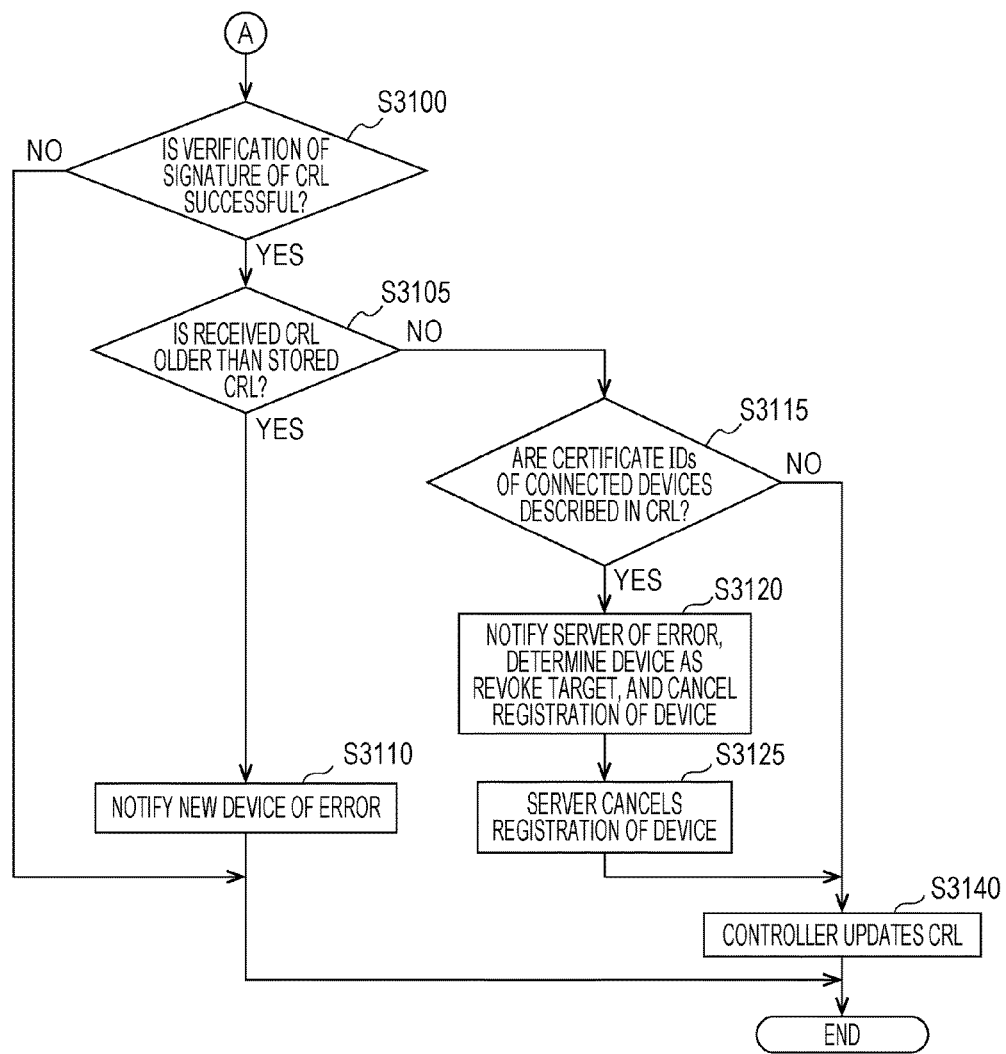
FIG. 31 is a third flowchart of the process for updating CRLs at the purchase of a device.

FIGS. 29 to 31 are flowcharts of the process for updating CRLs at the purchase of a device.

The process for updating CRLs at the purchase of a device starts when the new device 110 is connected to the HAN 130.

The process for updating CRLs at the purchase of a device includes the same processing as the processing included in the process for updating device CRLs according to the first embodiment.

Processing that is not included in the process for updating device CRLs will therefore be mainly described here, and the processing included in the process for updating device CRLs will be only explained as such.

After the process for updating CRLs at the purchase of a device starts, the new device 110 transmits the CRL 600 stored therein to all the existing devices 110 and the controllers 120 connected to the HAN 130 to which the new device 110 is connected (step S2900).

Processing in steps S2910 to S3080 (refer to FIGS. 29 and 30) will be described as processing performed by the existing devices and processing in steps S3100 to S3140 (refer to FIG. 31) will be described as processing performed by the controllers 120.

After the processing in step S2900 ends, the processing performed by the existing devices and the processing performed by the controllers start.

In the processing performed by the existing devices, an existing device 110 receives the CRL 600 transmitted from the new device 110 and verifies a signature of the received CRL 600 (step S2910).

If the verification of the signature of the CRL 600 is successful in the processing in step S2910 (step S2910: Yes), the existing device 110 compares a CRL version of the received CRL 600 with a CRL version of the CRL 600 stored therein (step S2920).

If the CRL version of the received CRL 600 is older than the CRL version of the CRL 600 stored in the existing device 110 in the processing in step S2920 (step S2920: Yes), the existing device 110 notifies the new device 110 of the error (step S2930).

If the CRL version of the received CRL 600 is not older than the CRL version of the CRL 600 stored in the existing device 110 in the processing in step S2920 (step S2920: No), the process proceeds to processing in step S2945.

The processing in step S2945, processing in step S2950, and processing in steps S3000 to S3080 are the same as the processing in step S1945, the processing in step S1950, and the processing in steps S2000 to S2080, respectively, in the process for updating device CRLs according to the first embodiment (refer to FIGS. 19 and 20). That is, they have already been described.

In the processing performed by the controllers, a controller 120 receives the CRL 600 transmitted from the new device 110 and verifies the signature of the received CRL 600 (step S3100).

If the verification of the signature of the CRL 600 is successful in the processing in step S3100 (step S3100: Yes), the controller 120 compares the CRL version of the received CRL 600 with a CRL version of the CRL 600 stored therein (step S3105).

If the CRL version of the received CRL 600 is older than the CRL version of the CRL 600 stored in the controller 120 in the processing in step S2920 (step S3105: Yes), the existing device 110 notifies the new device 110 of the error (step S3110).

If the CRL version of the received CRL 600 is not older than the CRL version of the CRL 600 stored in the controller 120 in the processing in step S3105 (step S3105: No), the process proceeds to processing in step S3115.

The processing in steps S3115 to S3125 is the same as the processing in steps S1915 to S1925, respectively, in the process for updating device CRLs according to the first embodiment (refer to FIGS. 19 and 20). That is, they have already been described.

If any public key certificate ID described in the received CRL 600 does not exist among public key certificate IDs of the devices 110 connected to the HAN 130 to which the controller 120 is connected in the processing in step S3115 (step S3115: No) or after the processing in step S3125 ends, the controller 120 updates the CRL stored in the authentication information storage unit 270 using the received CRL 600 (step S3140).

If the verification of the signature of the CRL 600 is not successful in the processing in step S2910 (step S2910: No), after the processing in step S2930 ends, if a controller 120 that has transmitted the CRL 600 is an unauthorized controller in the processing in step S3070 (step S3070: Yes), after processing in the step S3080 ends, if the verification of the signature of the CRL 600 is not successful in the processing in step S3100 (step S3100: No), after processing in step S3110 ends, or after the processing in step S3140 ends, the authentication system 2200 ends the process for updating CRLs at the purchase of a device.

FIG. 32 is a sequence diagram of a process performed by the new device 110, the existing device 110, and the controller 120 in the process for updating CRLs at the purchase of a device.

The figure is a sequence diagram at a time when the processing in step S2910 is Yes, the processing in step S2920 is No, the processing in step S2945 is No, the processing in step S3020 is No, the processing in step S3100 is Yes, the processing in step S3105 is No, and the processing in step S3115 is No.

After the process for updating CRLs at the purchase of a device starts, the new device 110 transmits the CRL 600 stored therein to all the existing devices 110 and the controllers 120 connected to the HAN 130 to which the new device 110 is connected (step S3200 and step S3205: correspond to step S2900).

The existing device 110 in turn succeeds in the verification of the signature of the received CRL 600 (step S3210: corresponds to step S2910: Yes) and checks that the CRL version of the received CRL 600 is not older than the CRL version of the CRL 600 stored therein (step S3215: corresponds to step S2920: No).

The existing device 110 then checks that any public key certificate ID described in the CRL 600 does not exist among the public key certificate IDs of the controllers 120 connected to the HAN 130 to which the existing device 110 is connected (step S3220: corresponds to No in step S2945) and checks that the CRLs do not contradict each other (step S3225: corresponds to step S3020: No). The existing device 110 then updates the CRL stored in the authentication information storage unit 970 using the received CRL 600 (step S3230: corresponds to step S3080).

On the other hand, the controller 120 succeeds in the verification of the signature of the received CRL 600 (step S3235: corresponds to step S3100: Yes) and checks that the CRL version of the received CRL 600 is not older than the CRL version of the CRL 600 stored therein (step S3240: corresponds to step S3105: No).

The controller 120 then checks that any public key certificate ID described in the CRL 600 does not exist among public key certificate IDs of the existing devices 110 connected to the HAN 130 to which the controller 120 is connected (step S3240: corresponds to step S3115: No) and updates the CRL stored in the authentication information storage unit 270 using the received CRL 600 (step S3250: corresponds to step S3140).

Examination

According to the authentication system 2200 having the above configuration, when a user who uses the authentication system 2200 purchases a device, a latest CRL at the time of the purchase is stored in the purchased device.

When the purchased device is connected to a HAN 130, CRLs stored in other devices 110 and controllers 120 connected to the HAN 130 are updated using the CRL stored in the purchased device if the CRL stored in the purchased device is not older than the CRLs stored in the other devices 110 and the controllers 120.

Supplementation

Although examples of the authentication system have been described above in the first embodiment and the second embodiment as aspects of the authentication method according to the present disclosure, the authentication method may be modified in the following manner. The authentication method is obviously not limited to the examples of the authentication system described in the first embodiment and the second embodiment.

(1) Although a device 110 obtains a CRL issued by the server 140 by communicating with the server 140 through a controller 120 in the first embodiment, the device 110 is not necessarily limited to a configuration in which a CRL is obtained through the controller 120 insofar as a CRL issued by the server 140 can be obtained.

In an example, the device 110 may have a function of directly communicating with the server 140. In another example, the device 110 may obtain a CRL through a terminal, other than the controller 120, having a function of communicating with the server 140.

Here, the communication between the controller 120 and the device 110 and the communication between devices 110 may be near field communication (NFL), Bluetooth (registered trademark) communication, Wi-Fi Direct (registered trademark) communication, specified low-power radio communication, or power-line communication, instead.

(2) Although when a device 110 determines a controller 120 as a revocation target, the device 110 notifies other devices 110 and other controllers 120 of the error in the first embodiment, a display screen indicating that the unauthorized controller (the controller determined by the device 110 as a revocation target) has been detected may be displayed if the devices 110 and the controllers 120 notified of the error have a function of displaying a screen. On the other hand, if the devices 110 and the controllers 120 do not have a function of displaying a screen, the error may be indicated by, for example, displaying an error code or flashing a lamp. Alternatively, control commands from the unauthorized controller may be simply ignored without being performed.

(3) In the first embodiment, a device 110 and a controller 120 may exchange keys for cryptographic communication during the process for registering a device. As a method for exchanging keys, Diffie-Hellman (DH) or elliptic curve Diffie-Hellman (ECDH) may be used.

(4) In the first embodiment, a controller 120 may display the power consumption of devices 110, the amount of power of storage batteries, and the amount of power generated through solar power generation.

(5) In the first embodiment, a controller 120 may be a distribution switchboard provided in a household.

(6) Although information indicating types, information indicating countries, and information indicating companies are described as examples of attribute information regarding devices included in a CRL in the first embodiment, the attribute information regarding devices are not necessarily limited to these. In an example, information indicating manufacture years or the like may be used.

(7) In the first embodiment, part or all of components configuring each of the apparatuses included in the authentication system 100 may be configured by a system LSI circuit. A system LSI circuit is an ultra-multifunction LSI circuit fabricated by integrating a plurality of components on a chip and, more specifically, a computer system configured by including a microprocessor, a ROM, a random-access memory (RAM), and the like. In the RAM, a computer program is recorded. The microprocessor operates in accordance with the computer program, and the system LSI circuit achieves a function thereof.

In addition, part or all of the components configuring each of the above-described apparatuses may be individually formed on a chip or formed on a chip while including part or all of the components.

In addition, although the term system LSI circuit is used here, a term IC, LSI circuit, super LSI circuit, or ultra LSI circuit may be used depending on the degree of integration. In addition, a method for realizing an integrated circuit is not limited to LSI, and an integrated circuit may be realized by a dedicated circuit or a general-purpose processor, instead. After an LSI circuit is fabricated, an field-programmable gate array (FPGA) capable of performing programming or a reconfigurable processor capable of reconfiguring connections and settings of circuit cells inside the LSI circuit may be used.

Furthermore, if a technique for realizing an integrated circuit that replaces LSI is developed as a result of evolution of semiconductor technologies or other derivative technologies, function blocks may be naturally integrated using the technique. Application of a biological technology is an example of such cases.

(8) In the first embodiment, part or all of the components configuring each of the above-described apparatuses included in the authentication system 100 may be configured by an integrated circuit (IC) card or a module removably attached to each apparatus. An IC card or a module is a computer system configured by a microprocessor, a ROM, a RAM, and the like. The IC card or the module may include the above ultra-multifunction LSI circuit. The microprocessor operates in accordance with a computer program, and the IC card or the module achieves a function thereof. The IC card or the module may be tamper-resistant.

(9) In the first embodiment, a computer program or a digital signal according to the authentication system 100 may be recorded in a computer-readable recording medium such as a flexible disk, a hard disk, a compact disc read-only memory (CD-ROM), a magneto-optical (MO) disk, a digital versatile disc (DVD), a DVD-ROM, a DVD-RAM, a BD, a semiconductor memory, or the like.

In addition, the computer program or the digital signal according to the authentication system 100 may be transmitted through an electrical communication line, a wireless or wired communication line, a network represented by the Internet, data broadcasting, or the like.

In addition, the computer program or the digital signal according to the authentication system 100 may be used by another independent computer system after recording the computer program or the digital signal in a computer-readable recording medium and transporting the computer-readable recording medium or after transporting the computer program or the digital signal according to the authentication system 100 through a network or the like.

(10) The above embodiments and the above modifications may be combined with one another.

(11) The configuration of an authentication method according to an aspect of the present disclosure and modifications and effects of the authentication method will be further described hereinafter.

(a) An authentication method according to an aspect of the present disclosure is an authentication method for at least one of a plurality of devices connected to a HAN. The authentication method includes checking, with a first device among the plurality of devices, validity of a second device using a CRL including identification information and attribute information regarding the second device among the plurality of devices, and revoking, with the first device, the second device if a result of the checking of the validity is negative.

According to the above-described authentication method according to an aspect of the present disclosure, the first device can use the attribute information regarding the second device included in the CRL during the search for determining whether a public key certificate ID of a public key certificate of the second device is described in the CRL. The amount of processing relating to the search can therefore be somewhat suppressed.

As described above, by using this authentication method, the validity of a device can be checked while somewhat suppressing the amount of processing relating to a search, which is carried out to check the validity of a device, for determining whether a public key certificate ID of the device to be authenticated is described in a CRL, even when the number of public key certificate IDs of revoked public key certificates described in the CRL is relatively large. If a result is negative, the device can be revoked.

(b) In addition, the attribute information may include information regarding a type of second device.

In doing so, information regarding a type of device to be authenticated can be used to authenticate the device.

(c) In addition, the information regarding the type of second device may include information indicating that the second device is a type of device having a function of being controlled by another device.

In doing so, information regarding a type when the device to be authenticated is a device having a function of being controlled by another device can be used to authenticate the device.

(d) In addition, the information regarding the type of second device may include information indicating that the second device may be a type of controller having a function of controlling another device.

In doing so, information regarding a type when the device to be authenticated is a controller can be used to authenticate the device.

(e) In addition, the attribute information may include information regarding a country in which the second device has been manufactured.

In doing so, information regarding a country in which a device to be authenticated has been manufactured can be used to authenticate the device.

(f) In addition, the attribute information may include information regarding a company that has manufactured the second device.

In doing so, information regarding a company that has manufactured the device to be authenticated can be used to authenticate the device.

(g) In addition, the first device may have a function of communicating with a server outside the HAN. The CRL may be one that the first device has received from the server.

In doing so, a CRL generated by a server outside a HAN can be used for authentication.

(h) In addition, the first device may obtain the attribute information regarding the second device from the second device and transmit the obtained attribute information to the server. The server may receive the transmitted attribute information, generate the CRL on the basis of the received attribute information, and transmit the generated CRL to the first device.

In doing so, the server can generate a CRL while determining the attribute information to be included in the CRL on the basis of the device information regarding the second device.

(i) In addition, the server may generate the CRL on the basis of the received device information such that the CRL does not include at least part of information identified as not used for the checking of the validity.

In doing so, the server can somewhat suppress the attribute information included in the CRL.

(j) In addition, the CRL may classify a device having a first attribute and a device having a second attribute into different tree structures. In the checking of the validity, only an applicable tree structure may be searched depending on whether the attribute information regarding the second device is the first attribute or the second attribute.

In doing so, the validity of the second device can be checked without searching tree structures other than the tree structure corresponding to the attribute information regarding the second device.

The authentication method according to the present disclosure can be widely used to authenticate devices connected to HANs.

What is claimed is:

1. An authentication method for at least one of a plurality of devices connected to a home area network, the plurality of devices including a first device configured to communicate with a server external to the home area network and a second device configured to communicate with the first device, the authentication method comprising:
receiving, by the first device from the second device, attribute information of the second device;
transmitting, to the server by the first device, the attribute information of the second device and attribute information of the first device;
receiving, from the server and by the first device, a certificate revocation list that is dynamically generated based on the attribute information of the second device, the certificate revocation list including identification information and the attribute information of the second device;

checking, by the first device, validity of the second device using the received certificate revocation list; and revoking, by the first device, the second device if a result of the checking of the validity is negative, wherein the certificate revocation list is dynamically generated by the server for the second device upon receipt of the attribute information of the second device, wherein the attribute information of the second device includes information regarding a type of the second device, and wherein the information regarding the type of the second device includes information indicating that the second device is a type of device having a function of being controlled by another device.

2. The authentication method according to claim 1, wherein the information regarding the type of the second device further includes information indicating that the second device is a type of controller having a function of controlling another device.

3. The authentication method according to claim 1, wherein the attribute information includes information regarding a country in which the second device has been manufactured.

4. The authentication method according to claim 1, wherein the attribute information includes information regarding a company that has manufactured the second device.

5. The authentication method according to claim 1, wherein the certificate revocation list is generated based on the attribute information such that the certificate revocation list omits at least part of information identified as not used for the checking of the validity.

6. The authentication method according to claim 1, wherein the certificate revocation list classifies a device having a first attribute and a device having a second attribute into different data tree structures, and wherein, in the checking of the validity, only an applicable data tree structure is searched depending on whether the attribute information of the second device includes the first attribute or the second attribute.

7. An authentication system comprising:

a first device and a second device connected to a home area network; and a server external to the home area network, wherein the first device is configured to communicate with the server, and the second device is configured to communicate with the first device, wherein the first device receives, from the second device, attribute information of the second device, wherein the first device transmits, to the server, the attribute information of the second device and attribute information of the first device;

wherein, when the server receives, from the first device, the attribute information of the second device, the server dynamically generates a certificate revocation list including identification information and the attribute information of the second device based on the attribute information of the second device, and wherein the first device receives, from the server, the certificate revocation list, checks validity of the second device using the certificate revocation list, and, if a result of the checking of the validity is negative, revokes the second device, wherein the attribute information of the second device includes information regarding a type of the second device, and wherein the information regarding the type of the second device includes information indicating that the second device is a type of device having a function of being controlled by another device.

8. The authentication system according to claim 7, further comprising an authentication device that includes:

a communication circuit configured to:
    transmit, to the server, the attribute information of the second device, and
    receive, from the server, the certificate revocation list generated based on the attribute information of the second device, the certification revocation list including the identification information and the attribute information of the second device; and a processor configured to:
    check the validity of the second device using the certificate revocation list, and
    revoke the second device if the result of the check of the validity is negative.

\* \* \* \* \*